US011544880B2

(12) United States Patent
Park et al.

(10) Patent No.: US 11,544,880 B2
(45) Date of Patent: Jan. 3, 2023

(54) GENERATING MODIFIED DIGITAL IMAGES UTILIZING A GLOBAL AND SPATIAL AUTOENCODER

(71) Applicant: Adobe Inc., San Jose, CA (US)

(72) Inventors: Taesung Park, Albany (CA); Richard Zhang, San Francisco, CA (US); Oliver Wang, Seattle, WA (US); Junyan Zhu, Cambridge, MA (US); Jingwan Lu, Santa Clara, CA (US); Elya Shechtman, Seattle, WA (US); Alexei A Efros, Berkley, CA (US)

(73) Assignee: Adobe Inc., San Jose, CA (US)

( * ) Notice: Subject to any disclaimer, the term of this patent is extended or adjusted under 35 U.S.C. 154(b) by 225 days.

(21) Appl. No.: 16/874,399

(22) Filed: May 14, 2020

(65) Prior Publication Data

US 2021/0358177 A1 Nov. 18, 2021

(51) Int. Cl.
*G06T 9/00* (2006.01)
*G06N 3/08* (2006.01)
*G06T 3/40* (2006.01)

(52) U.S. Cl.
CPC .............. *G06T 9/002* (2013.01); *G06N 3/08* (2013.01); *G06T 3/4046* (2013.01); *G06T 2200/24* (2013.01); *G06T 2210/36* (2013.01); *G06T 2219/2024* (2013.01)

(58) Field of Classification Search
None
See application file for complete search history.

(56) References Cited

U.S. PATENT DOCUMENTS

| | | | | |
|---|---|---|---|---|
| 10,789,288 | B1* | 9/2020 | Ranzinger | G06K 9/6215 |
| 2018/0173942 | A1* | 6/2018 | Kim | G10L 21/06 |
| 2019/0158813 | A1* | 5/2019 | Rowell | H04N 5/23267 |
| 2020/0151222 | A1* | 5/2020 | Mannar | G06V 10/30 |
| 2020/0302176 | A1* | 9/2020 | Yang | G06K 9/6256 |
| 2021/0118163 | A1* | 4/2021 | Guizilini | G06T 7/50 |
| 2021/0160018 | A1* | 5/2021 | Han | G06Q 20/108 |

OTHER PUBLICATIONS

Rameen Abdal, Yipeng Qin, and Peter Wonka. 2019. Image2StyleGAN: How to Embed Images Into the StyleGAN Latent Space?. In ICCV, Nov. 2019.

Kfir Aberman, Jing Liao, Mingyi Shi, Dani Lischinski, Baoquan Chen, and Daniel Cohen-Or. 2018. Neural best-buddies: Sparse cross-domain correspondence. ACM TOG 37, 4 (2018), 69, Aug. 2018.

(Continued)

*Primary Examiner* — Joni Hsu
(74) *Attorney, Agent, or Firm* — Keller Preece PLLC

(57) ABSTRACT

The present disclosure relates to systems, methods, and non-transitory computer readable media for generating a modified digital image from extracted spatial and global codes. For example, the disclosed systems can utilize a global and spatial autoencoder to extract spatial codes and global codes from digital images. The disclosed systems can further utilize the global and spatial autoencoder to generate a modified digital image by combining extracted spatial and global codes in various ways for various applications such as style swapping, style blending, and attribute editing.

20 Claims, 17 Drawing Sheets

(56) References Cited

OTHER PUBLICATIONS

Muhammad Asim, Fahad Shamshad, and Ali Ahmed. 2018. Blind image deconvolution using deep generative priors. arXiv preprint arXiv:1802.04073 (2018), Feb. 2018.

Hadar Averbuch-Elor, Daniel Cohen-Or, and Johannes Kopf. 2016. Smooth Image Sequences for Data-driven Morphing. Computer Graphics Forum, (Proceedings Eurographics 2016) 35, 2 (2016), to appear, May 2016.

Connelly Barnes, Eli Shechtman, Adam Finkelstein, and Dan B Goldman. 2009. Patch-Match: A randomized correspondence algorithm for structural image editing. ACM TOG 28, 3 (2009), 24, Aug. 2009.

David Bau, Hendrik Strobelt, William Peebles, Jonas Wulff, Bolei Zhou, Jun-Yan Zhu, and Antonio Torralba. 2019a. Semantic photo manipulation with a generative image prior. SIGGRAPH 38, 4 (2019), 1-11, Jul. 2019.

David Bau, Jun-Yan Zhu, Jonas Wulff, William Peebles, Hendrik Strobelt, Bolei Zhou, and Antonio Torralba. 2019b. Seeing What a GAN Cannot Generate. In ICCV, Nov. 2019.

Thaddeus Beier and Shawn Neely. 1992. Feature-based image metamorphosis. SIG-GRAPH Comput. Graph. 26, 2 (1992), 35-42. https://doi.org/10.1145/142920.134003, Jul. 1992.

Yoshua Bengio. 2013. Deep learning of representations: Looking forward. In International Conference on Statistical Language and Speech Processing. Springer, 1-37, Jun. 2013.

Andrew Brock, Jeff Donahue, and Karen Simonyan. 2019. Large scale gan training for high fidelity natural image synthesis. In ICLR, Jul. 2019.

Andrew Brock, Theodore Lim, James M Ritchie, and Nick Weston. 2017. Neural photo editing with introspective adversarial networks. In ICLR, month unknown.

P. J. Burt. 1984. The Pyramid as a Structure for Efficient Computation. Springer. https://doi.org/10.1007/978-3-642-51590-3_2, month unknown.

Peter J Burt and Raymond J Kolczynski. 1993. Enhanced image capture through fusion. In ICCV, month unknown.

Qifeng Chen and Vladlen Koltun. 2017. Photographic image synthesis with cascaded refinement networks. In Proceedings of the IEEE International Conference on Computer Vision. 1511-1520, Jul. 2017.

Yunjey Choi, Minje Choi, Munyoung Kim, Jung-Woo Ha, Sunghun Kim, and Jaegul Choo. 2018. Stargan: Unified generative adversarial networks for multi-domain image-to-image translation. In CVPR, Dec. 2018.

Soheil Darabi, Eli Shechtman, Connelly Barnes, Dan B Goldman, and Pradeep Sen. 2012. Image Melding: Combining Inconsistent Images using Patch-based Synthesis. ACMTOG 31, 4, Article 82 (2012), 82:1-82:10 pages, Jul. 2012.

Alexey Dosovitskiy and Thomas Brox. 2016. Generating images with perceptual similarity metrics based on deep networks. In NeurIPS, Feb. 2016.

Leon A Gatys, Alexander S Ecker, and Matthias Bethge. 2016. Image Style Transfer Using Convolutional Neural Networks. CVPR (2016), Dec. 2016.

Ian Goodfellow, Jean Pouget-Abadie, Mehdi Mirza, Bing Xu, David Warde-Farley, Sherjil Ozair, Aaron Courville, and Yoshua Bengio. 2014. Generative adversarial nets. In NIPS, Dec. 2014.

Éric Guérin, Julie Digne, Éric Galin, Adrien Peytavie, Christian Wolf, Bedrich Benes, and Benoundefinedt Martinez. 2017. Interactive Example-Based Terrain Authoring with Conditional Generative Adversarial Networks. ACM TOG 36, 6 (2017), Nov. 2017.

Bharath Hariharan, Pablo Arbeláez, Ross Girshick, and Jitendra Malik. 2015. Hypercolumns for object segmentation and fine-grained localization. In Proceedings of the IEEE conference on computer vision and pattern recognition. 447-456, month unknown.

Kaiming He, Haoqi Fan, Yuxin Wu, Saining Xie, and Ross Girshick. 2019. Momentum contrast for unsupervised visual representation learning. arXiv preprint arXiv:1911.05722 (2019), Nov. 2019.

Kaiming He, Xiangyu Zhang, Shaoqing Ren, and Jian Sun. 2016. Deep residual learning for image recognition. In CVPR, month unknown.

Mingming He, Dongdong Chen, Jing Liao, Pedro V Sander, and Lu Yuan. 2018. Deep exemplar-based colorization. ACM TOG 37, 4 (2018), 1-16, Jul. 2018.

Olivier J Hénaff, Ali Razavi, Carl Doersch, SM Eslami, and Aaron van den Oord. 2019. Data-efficient image recognition with contrastive predictive coding. arXiv preprint arXiv:1905.09272 (2019), Dec. 2019.

Aaron Hertzmann, Charles E Jacobs, Nuria Oliver, Brian Curless, and David H Salesin. 2001. Image analogies. In SIGGRAPH, Aug. 2001.

Geoffrey E Hinton and Ruslan R Salakhutdinov. 2006. Reducing the dimensionality of data with neural networks. Science 313, 5786 (2006), 504-507, Jul. 2006.

Qiyang Hu, Attila Szabó, Tiziano Portenier, Paolo Favaro, and Matthias Zwicker. 2018. Disentangling factors of variation by mixing them. In CVPR, Aug. 2018.

Xun Huang and Serge Belongie. 2017. Arbitrary style transfer in real-time with adaptive instance normalization. In Proceedings of the IEEE International Conference on Computer Vision. 1501-1510, Jul. 2017.

Xun Huang, Ming-Yu Liu, Serge Belongie, and Jan Kautz. 2018. Multimodal Unsupervised Image-to-Image Translation. ECCV (2018), Aug. 2018.

Satoshi Iizuka, Edgar Simo-Serra, and Hiroshi Ishikawa. 2016. Let there be Color!: Joint End-to-end Learning of Global and Local Image Priors for Automatic Image Colorization with Simultaneous Classification. ACM TOG 35, 4 (2016), Jul. 2016.

Satoshi Iizuka, Edgar Simo-Serra, and Hiroshi Ishikawa. 2017. Globally and locally consistent image completion. ACM TOG 36, 4 (2017), 107, Jul. 2017.

Phillip Isola, Jun-Yan Zhu, Tinghui Zhou, and Alexei A Efros. 2017. Image-to-image translation with conditional adversarial networks. In CVPR, Nov. 2017.

Ananya Harsh Jha, Saket Anand, Maneesh Singh, and VSR Veeravasarapu. 2018. Disentangling factors of variation with cycle-consistent variational auto-encoders. In ECCV, Apr. 2018.

Justin Johnson, Alexandre Alahi, and Li Fei-Fei. 2016. Perceptual losses for real-time style transfer and super-resolution. In ECCV, Mar. 2016.

Tero Karras, Samuli Laine, and Timo Aila. 2019. A style-based generator architecture for generative adversarial networks. In CVPR, month unknown.

Diederik P Kingma and Max Welling. 2014. Auto-encoding variational bayes. ICLR (2014), May 2014.

Nicholas Kolkin, Jason Salavon, and Gregory Shakhnarovich. 2019. Style Transfer by Relaxed Optimal Transport and Self-Similarity. In Proceedings of the IEEE Conference on Computer Vision and Pattern Recognition. 10051-10060, Oct. 2019.

Tuomas Kynkäänniemi, Tero Karras, Samuli Laine, Jaakko Lehtinen, and Timo Aila. 2019. Improved precision and recall metric for assessing generative models. In NeurIPs, Oct. 2019.

Pierre-Yves Laffont, Zhile Ren, Xiaofeng Tao, Chao Qian, and James Hays. 2014. Transient Attributes for High-Level Understanding and Editing of Outdoor Scenes. ACM Transactions on Graphics (proceedings of SIGGRAPH) 33, 4(2014), Jul. 2014.

Seungyong Lee, George Woberg, Kyung-Yong Chwa, and Sung Yong Shin. 1996. Image Metamorphosis with Scattered Feature Constraints. TVCG 2, 4 (1996), 337-354, Dec. 1996.

Yijun Li, Chen Fang, Jimei Yang, Zhaowen Wang, Xin Lu, and Ming-Hsuan Yang. 2017a. Diversified Texture Synthesis with Feedforward Networks. In IEEE Conference on Computer Vision and Pattern Recognition, Mar. 2017.

Yijun Li, Chen Fang, Jimei Yang, Zhaowen Wang, Xin Lu, and Ming-Hsuan Yang. 2017b. Universal Style Transfer via Feature Transforms. In Advances in Neural Information Processing Systems, Nov. 2017.

Yijun Li, Ming-Yu Liu, Xueting Li, Ming-Hsuan Yang, and Jan Kautz. 2018. A closed-form solution to photorealistic image stylization. In ECCV, Jul. 2018.

(56) References Cited

OTHER PUBLICATIONS

Jing Liao, Diego Nehab, Hugues Hoppe, and Pedro V Sander. 2016. New Controls for Combining Images in Correspondence. TVCG 7 (2016), 1875-1885, Jul. 2016.

Jing Liao, Yuan Yao, Lu Yuan, Gang Hua, and Sing Bing Kang. 2017. Visual Attribute Transfer Through Deep Image Analogy. ACM Trans. Graph. 36, 4, Article 120 (Jul. 2017), 15 pages. https://doi.org/10.1145/3072959.3073683.

Guilin Liu, Fitsum A Reda, Kevin J Shih, Ting-Chun Wang, Andrew Tao, and Bryan Catanzaro. 2018. Image inpainting for irregular holes using partial convolutions. In ECCV, Dec. 2018.

Fujun Luan, Sylvain Paris, Eli Shechtman, and Kavita Bala. 2017. Deep Photo Style Transfer. In CVPR, Apr. 2017.

Michael F Mathieu, Junbo Zhao, Aditya Ramesh, Pablo Sprechmann, and Yann LeCun. 2016. Disentangling factors of variation in deep representation using adversarial training. InNeurIPS, Nov. 2018.

Lars Mescheder, Andreas Geiger, and Sebastian Nowozin. 2018. Which training methods for GANs do actually converge? arXiv preprint arXiv:1801.04406 (2018), Jul. 2018.

Mehdi Mirza and Simon Osindero. 2014. Conditional generative adversarial nets. arXiv preprint arXiv:1411.1784 (2014), Nov. 2014.

Aude Oliva, Antonio Torralba, and Philippe G Schyns. 2006. Hybrid images. ACM TOG 25, 3 (2006), 527-532, Jul. 2006.

Aaron van den Oord, Yazhe Li, and Oriol Vinyals. 2018. Representation learning with contrastive predictive coding. arXiv preprint arXiv:1807.03748 (2018), Jul. 2018.

Taesung Park, Ming-Yu Liu, Ting-Chun Wang, and Jun-Yan Zhu. 2019. Semantic Image Synthesis with Spatially-Adaptive Normalization. In CVPR, Nov. 2019.

Deepak Pathak, Philipp Krahenbuhl, Jeff Donahue, Trevor Darrell, and Alexei A Efros. 2016. Context Encoders: Feature Learning by Inpainting. CVPR (2016), Apr. 2016.

Guim Perarnau, Joost van de Weijer, Bogdan Raducanu, and Jose M Álvarez. 2016. Invertible conditional gans for image editing. In NIPS Workshop on Adversarial Training, Nov. 2016.

Tiziano Portenier, Qiyang Hu, Attila Szabó, Siavash Arjomand Bigdeli, Paolo Favaro, and Matthias Zwicker. 2018. Faceshop: Deep Sketch-based Face Image Editing. ACM TOG 37, 4 (2018) 13, Aug. 2018.

Alec Radford, Luke Metz, and Soumith Chintala. 2016. Unsupervised representation learning with deep convolutional generative adversarial networks. In ICLR, month unknown.

Eric Risser, Charles Han, Rozenn Dahyot, and Eitan Grinspun. 2010. Synthesizing structured image hybrids. ACM TOG 29, 4 (2010), 1-6, Jul. 2010.

Olaf Ronneberger, Philipp Fischer, and Thomas Brox. 2015. U-net: Convolutional networks for biomedical image segmentation. In MICCAI. Springer, 234-241, May 2015.

Patsorn Sangkloy, Jingwan Lu, Chen Fang, Fisher Yu, and James Hays. 2017. Scribbler: Controlling Deep Image Synthesis with Sketch and Color. In CVPR, Nov. 2017.

Eli Shechtman, Alex Rav-Acha, Michal Irani, and Steve Seitz. 2010. Regenerative Morphing. In CVPR. San-Francisco, CA, Feb. 2010.

Krishna Kumar Singh, Utkarsh Ojha, and Yong Jae Lee. 2019. Finegan: Unsupervised hierarchical disentanglement for fine-grained object generation and discovery. In CVPR, Apr. 2019.

Joshua B Tenenbaum and William T Freeman. 2000. Separating style and content with bilinear models. Neural computation 12, 6 (2000), 1247-1283, Jun. 2000.

Yonglong Tian, Dilip Krishnan, and Phillip Isola. 2019. Contrastive Multiview Coding. arXiv preprint arXiv:1906.05849 (2019), Oct. 2019.

Dmitry Ulyanov, Vadim Lebedev, Andrea Vedaldi, and Victor Lempitsky. 2016. Texture networks: Feed-forward synthesis of textures and stylized images. In ICML, Jun. 2016.

Ting-Chun Wang, Ming-Yu Liu, Jun-Yan Zhu, Andrew Tao, Jan Kautz, and Bryan Catanzaro. 2018. High-Resolution Image Synthesis and Semantic Manipulation with Conditional GANs. In CVPR, Aug. 2018.

Zhou Wang, Alan C Bovik, Hamid R Sheikh, and Eero P Simoncelli. 2004. Image quality assessment: from error visibility to structural similarity. IEEE Transactions on Image Processing 13, 4 (2004), 600-612, Apr. 2004.

George Wolberg. 1990. Digital Image Warping. IEEE Computer Society Press, Los Alamitos, CA, Aug. 1990.

Wenqi Xian, Patsorn Sangkloy, Varun Agrawal, Amit Raj, Jingwan Lu, Chen Fang, Fisher Yu, and James Hays. 2017. Texturegan: Controlling deep image synthesis with texture patches. arXiv preprint arXiv:1706.02823 (2017), Dec. 2017.

Chao Yang, Xin Lu, Zhe Lin, Eli Shechtman, Oliver Wang, and Hao Li. 2017. High-resolution image inpainting using multi-scale neural patch synthesis. In CVPR, Apr. 2017.

Raymond A Yeh, Chen Chen, Teck Yian Lim, Alexander G Schwing, Mark Hasegawa-Johnson, and Minh N Do. 2017. Semantic image inpainting with deep generative models. In CVPR, Jul. 2017.

Jaejun Yoo, Youngjung Uh, Sanghyuk Chun, Byeongkyu Kang, and Jung-Woo Ha. 2019. Photorealistic Style Transfer via Wavelet Transforms. arXiv preprint arXiv:1903.09760 (2019), Sep. 2019.

Fisher Yu, Ari Seff, Yinda Zhang, Shuran Song, Thomas Funkhouser, and Jianxiong Xiao. 2015. Lsun: Construction of a large-scale image dataset using deep learning with humans in the loop. arXiv preprint arXiv:1506.03365 (2015), Jun. 2015.

Richard Zhang. 2019. Making convolutional networks shift-invariant again, Jun. 2019.

Richard Zhang, Phillip Isola, and Alexei A Efros. 2016. Colorful Image Colorization. In ECCV, Oct. 2016.

Richard Zhang, Phillip Isola, Alexei A Efros, Eli Shechtman, and Oliver Wang. 2018. The unreasonable effectiveness of deep features as a perceptual metric. In CVPR. 586-595, Apr. 2018.

Richard Zhang, Jun-Yan Zhu, Phillip Isola, Xinyang Geng, Angela S Lin, Tianhe Yu, and Alexei A Efros. 2017. Real-Time User-Guided Image Colorization with Learned Deep Priors. ACM TOG 9, 4 (2017), Aug. 2017.

Yang Zhou, Zhen Zhu, Xiang Bai, Dani Lischinski, Daniel Cohen-Or, and Hui Huang. 2018. Non-stationary Texture Synthesis by Adversarial Expansion. ACM TOG 37, 4 (2018), May 2018.

Jun-Yan Zhu, Philipp Krähenbühl, Eli Shechtman, and Alexei A. Efros. 2016. Generative Visual Manipulation on the Natural Image Manifold. In ECCV, Sep. 2016.

Jun-Yan Zhu, Taesung Park, Phillip Isola, and Alexei A Efros. 2017a. Unpaired Image-to-Image Translation using Cycle-Consistent Adversarial Networks. In ICCV, Nov. 2017.

Jun-Yan Zhu, Richard Zhang, Deepak Pathak, Trevor Darrell, Alexei A Efros, Oliver Wang, and Eli Shechtman. 2017b. Toward multimodal image-to-image translation. In NeurIPS, Nov. 2017.

* cited by examiner

| Dataset | Im2StyleGAN | Disclosed DIM System (Swapping) | Disclosed DIM System (Editing) |
|---|---|---|---|
| 256×256 bedroom | 172.37 | 0.01 | 16.49 |
| 512×512 landscape | 366.50 | 0.02 | 65.86 |

*Fig. 11*

GENERATING MODIFIED DIGITAL IMAGES UTILIZING A GLOBAL AND SPATIAL AUTOENCODER

BACKGROUND

In the field of digital image editing, deep generative models have become increasingly effective at producing realistic images from randomly sampled seeds. These models, such as generative adversarial networks ("GANs"), have revolutionized digital image synthesis, enabling photorealistic rendering of complex phenomena such as faces and other object categories. However, using conventional deep generative models for controllable manipulation of a specific existing digital image remains surprisingly challenging. Indeed, despite the advances of systems that utilize these models, conventional digital image editing systems continue to suffer from a number of disadvantages in accuracy, efficiency, and flexibility.

For example, many conventional digital image editing systems inaccurately generate digital images. Indeed, to generate digital images, many conventional systems learn a mapping from an easy-to-sample (typically Gaussian) distribution of the image domain. As a result, these conventional systems are effective at drawing random samples of arbitrary digital images in a target domain, but these systems cannot accurately generate specific digital images (e.g., a particular user-selected digital image).

In addition to inaccuracy, many conventional digital image editing systems are also inefficient. To elaborate, in attempts to solve the above issue for generating specific digital images, some conventional systems utilize conditional generative models, which directly synthesize an output conditional on a given input digital image. However, such systems not only require the task to be defined a priori, but they further require extensive training data and retraining of the model for each new application. Thus, these conventional digital image editing systems inefficiently utilize computing resources such as processing time, processing power, and memory to perform such expensive training and retraining. Other conventional systems retrofit pre-trained unconditional GAN models by looking for semantically meaningful editing operations in an existing latent space. However, the operations of these systems are both computationally expensive and time-consuming in projecting a specific digital image onto its corresponding latent code.

Beyond inaccuracy and inefficiency, many conventional digital image editing systems are further inflexible. Particularly, as mentioned above, conventional systems often generate digital images based on arbitrary sampling, and therefore, cannot adapt to scenarios where generating specific digital images is required, such as editing of a user-selected digital image. In addition, some conventional systems are too slow for application in on-the-fly image manipulation. Indeed, the extensive human-curated training data and/or the retraining of a model for each new application of conventional systems prevents these systems from flexible runtime use.

Thus, there are several disadvantages with regard to conventional digital image editing systems.

SUMMARY

One or more embodiments described herein provide benefits and solve one or more of the foregoing or other problems in the art with systems, methods, and non-transitory computer readable media that can accurately and efficiently generate digital images utilizing a global and spatial autoencoder. In particular, the disclosed systems can utilize the global and spatial autoencoder to split latent code of a digital image into two separate components: a spatial code that represents a geometric layout of the digital image and a global code that represents the overall image properties of the digital image. Indeed, by utilizing the global and spatial autoencoder, the disclosed systems can perform digital image hybridization as a pretext task for learning an embedding useful for digital image manipulation. The disclosed systems can swap the spatial code and the global code between pairs of digital images (e.g., by selecting a spatial code from a first digital image and a global code from a second digital image or vice-versa) and can enforce that the resulting hybrid digital image looks realistic. By inductive bias, the disclosed systems can learn compositionality for embeddings that are suitable for generating specific digital images as well as for digital image manipulation.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 11 illustrates a table depicting speed improvements of the deep image manipulation system over conventional systems in accordance with one or more embodiments;

DETAILED DESCRIPTION

Figure 1:
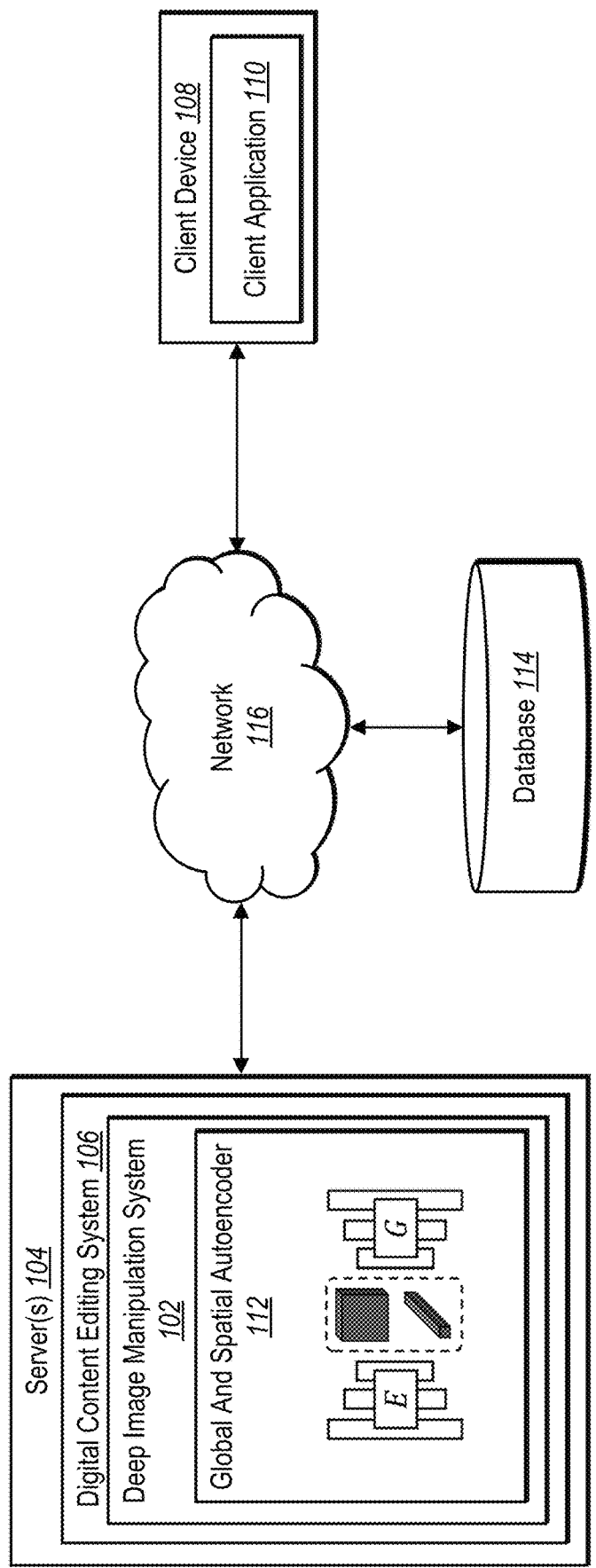
FIG. 1 illustrates an example system environment in which a deep image manipulation system can operate in accordance with one or more embodiments.

One or more embodiments described herein include a deep image manipulation system that can generate digital images utilizing a global and spatial autoencoder. More specifically, the deep image manipulation system can generate a hybrid digital image by combining or otherwise manipulating latent codes of digital images in particular ways, depending on a desired effect. For example, the deep image manipulation system can generate a hybrid digital image that includes spatial features of a first digital image and global features of a second digital image. In particular, the deep image manipulation system can utilize a global and spatial autoencoder that includes an encoder to extract latent codes from one or more digital images and a generator to combine swapped or otherwise manipulated latent codes to generate resultant digital images.

For example, the deep image manipulation system can extract a spatial code and a global code from a digital image utilizing an encoder neural network of the global and spatial autoencoder. In addition, the deep image manipulation system can generate a spatial code and a global code from an additional digital image (or from a set of digital images). Further, the deep image manipulation system can generate a modified digital image by combining or otherwise manipulating latent codes in particular ways. For instances the deep image manipulation system can utilize a generator neural network to combine a spatial code (e.g., a spatial code from a first digital image) with a global code (e.g., a global code from a second digital image). Thus, the deep image manipulation system can generate a modified digital image that depicts the style of one digital image with the geometric layout of another digital image.

As mentioned, the deep image manipulation system can extract a spatial code and a global code from a digital image utilizing an encoder neural network. Indeed, the deep image manipulation system can utilize the encoder neural network to map the digital image to a latent feature space where disentangled factors emerge within individual elements of the latent code. In particular, the deep image manipulation system can map the digital image into two latent components: a spatial code and a global code. For instance, the deep image manipulation system can extract a spatial code that includes features corresponding to a geometric layout of the digital image. In addition, the deep image manipulation system can extract a global code that includes features corresponding to overall image properties of the digital image.

As also mentioned, the deep image manipulation system can generate a modified digital image utilizing extracted spatial codes and extracted global codes. More particularly, the deep image manipulation system can generate modified digital images by manipulating extracted spatial codes and extracted global codes for effects such as digital image reconstruction, style swapping, style blending, and attribute editing.

For style swapping, the deep image manipulation system can combine a spatial code with a global code (from a different digital image or determined based on multiple digital images) utilizing a generator neural network. Indeed, the deep image manipulation system can combine a spatial code from a first digital image with a global code from a second digital image to generate a modified digital image that depicts a geometric layout of the first digital image and an overall appearance (e.g., a color scheme or an aesthetic) of the second digital image. Thus, the deep image manipulation system generates modified digital images by swapping styles (e.g., swapping global codes) of digital images.

For blending styles, the deep image manipulation system can combine a spatial code from an initial digital image with a composite global code corresponding to multiple digital images. For instance, the deep image manipulation system can extract global codes from a plurality of digital images and can combine the global codes into a composite global code. More specifically, the deep image manipulation system can generate an average global code by averaging the extracted global codes from the plurality of digital images. In at least one embodiment, the deep image manipulation system further weights the composite (e.g., average) global code and/or the spatial code utilizing a slider variable to dictate how much to emphasize the composite global code versus the spatial code in generating a modified digital image. Thus, by utilizing the generator neural network to combine the composite global code with the spatial code of the initial digital image, the deep image manipulation system can blend styles of digital images.

For attribute editing, the deep image manipulation system can extract latent codes from one or more digital images that depict a particular attribute (e.g., a smiling face or a snowy landscape). The deep image manipulation system can further extract latent codes from one or more of digital images that do not depict the particular attribute (e.g., a non-smiling face or a snow-less landscape). Additionally, the deep image manipulation system can determine directions in the latent space that increase and decrease the attribute by subtracting the average latent code of images without the attribute from the average latent code of images with the attribute. Thus, the deep image manipulation system can generate a modified digital image by editing the attribute (e.g., a degree of smiling or an amount of snow) of a digital image by moving the latent code of the digital image in of the determined directions (either to increase or decrease the attribute).

As suggested above, the deep image manipulation system can provide several advantages over conventional digital image editing systems. For example, the deep image manipulation system is more accurate than conventional systems. In particular, while many conventional systems utilize conventional generative models to generate digital images from random samples (which makes them unfit for accurately generating specific digital images), the deep image manipulation system utilizes a novel model architecture (i.e., a global and spatial autoencoder) designed specifically for digital image manipulation. Indeed, the architecture of the global and spatial autoencoder enable the deep image manipulation system to accurately generate specific digital images and manipulate particular attributes of digital images.

In addition to its novel architecture, the deep image manipulation system trains the global and spatial autoencoder to accurately generate specific digital images by swapping spatial codes and global codes between pairs of digital images, thus forcing the global and spatial autoencoder to learn compositionality. By learning compositionality in this way, the deep image manipulation system can learn embeddings that are suitable for digital image manipulation: spatial features naturally correspond to geometric layout of a digital image, and global features naturally capture an overall appearance. Additionally, by utilizing a contrastive loss to force extracted spatial codes and extracted global codes to be more similar to corresponding codes from input digital images than to stored spatial codes and stored global codes, the deep image manipulation system further improves the accuracy and realism of resultant digital images.

In addition to improved accuracy, the deep image manipulation system further provides improved efficiency over many conventional digital image editing systems. In particular, as opposed to conventional systems that require extensive amounts training data for training and re-training models for each new input digital image, the deep image manipulation system implements a global and spatial autoencoder architecture that can generate a digital image based on few (e.g., one) examples at run-time. Thus, not only can the deep image manipulation system generate digital images faster than conventional systems (e.g., at run-time as opposed to requiring extensive a priori training), but the deep image manipulation system can further utilize fewer computing resources such as processing power, processing time, and memory that conventional systems require to store and analyze large amounts of training data for each new application. Relating to this improved efficiency, experimenters have demonstrated that the deep image manipulation system can swap styles in real time (roughly four orders of magnitude faster than conventional systems) and can manipulate digital images roughly six to ten times faster than conventional systems.

Beyond improved accuracy and efficiency, the deep image manipulation system further provides improved flexibility over conventional digital image editing systems. More specifically, rather than conventional systems that generate digital images based on arbitrary sampling (and therefore cannot adapt to scenarios where generating specific digital images is required), the deep image manipulation system can adapt for specific digital images using only a few (e.g., one) example digital images. In addition, whereas many conventional systems are too slow for on-the-fly generation of digital images at run time (e.g., due to their inefficient training and re-training required for each new digital image), the deep image manipulation system requires only a few examples at run time and can therefore flexibly adapt to generate different digital images on-the-fly for use in real-time digital image manipulation.

As suggested by the foregoing discussion, the present disclosure utilizes a variety of terms to describe features and benefits of the deep image manipulation system. Additional detail is hereafter provided regarding the meaning of these terms as used in this disclosure. In particular, the term "feature" refers to digital information describing all or part of a digital image. Features can be represented as vectors, tensors, or codes (e.g., latent codes) that the deep image manipulation system generates by extracting features utilizing the global and spatial autoencoder. Features can include observable characteristics or observable information pertaining to a digital image such as a color or a geometric layout. Additionally (or alternatively), features can include latent features (e.g., features within the various layers of a neural network and that may change as they are passed from layer to layer) and/or unobservable deep features generated by a global and spatial autoencoder.

Relatedly, the term "spatial feature" refers to a feature corresponding to the geometric layout of a digital image. The deep image manipulation system can extract spatial features from a digital image to represent the geometric layout of the digital image—i.e., the spatial structure, the relative positioning, and/or the arrangement of various objects or portions of the digital image. Indeed, the deep image manipulation system can extract a "spatial code" that includes multiple spatial features and that describes the geometric layout of a digital image as a whole. A spatial code can include a vector or a tensor of latent features that, though not necessarily discernable by a human observer, are interpretable by the global and spatial autoencoder to describe the geometric layout of a digital image.

Along similar lines, as used herein, the term "global feature" refers to a feature corresponding to overall image properties or an overall appearance of a digital image. To elaborate, a global feature can represent an aesthetic of a digital image including a texture, a style, an illumination, a color scheme, a shading, and/or a perspective of a digital image. Indeed, the deep image manipulation system can extract a "global code" that includes multiple global features and that describes the overall image properties or the overall appearance of a digital image as a whole. A global code can include a vector or a tensor of latent features that are not necessarily discernable by a human observer, but that are interpretable by the global and spatial autoencoder to describe the overall appearance of a digital image.

As mentioned, the deep image manipulation system utilizes a global and spatial autoencoder including an encoder neural network and a generator neural network to extract spatial features and global features from digital images. As used herein, the term "neural network" refers to a machine learning model that can be tuned (e.g., trained) based on inputs to approximate unknown functions. In particular, a neural network can include a model of interconnected artificial neurons (e.g., organized in layers) that communicate and learn to approximate complex functions and generate outputs based on a plurality of inputs provided to the model. In addition, a neural network can refer to an algorithm (or a set of algorithms) that implements deep learning techniques to model high-level abstractions in data.

Relatedly, an "encoder neural network" refers to a neural network that can extract features from a digital image. In particular an encoder neural network can extract "latent code" from a digital image, including a spatial code and a global code. In some embodiments, an encoder neural network includes "residual blocks" that refer to blocks within a main branch of layers of the encoder neural network and that are utilized to generate a global code. In these or other embodiments, an encoder neural network includes "layout blocks" that refer to blocks not within the main branch of the encoder neural network and that are utilized to analyze intermediate (e.g., non-output) features to generate a spatial code. Additional detail regarding the architecture of the encoder neural network is provided below with reference to the figures.

Additionally, the term "generator neural network" refers to a neural network that can generate a modified digital image by combining spatial codes and global codes. In particular, a generator neural network can generate a modified digital image by combining a spatial code from one digital image with a global code from another digital image. Additional detail regarding the architecture of the generator neural network is provided below with reference to the figures.

As mentioned above, the deep image manipulation system can generate an attribute code based on extracting global codes from multiple digital images. As used herein, the term "attribute code" refers to a feature vector or a tensor that describes or represents an attribute of a digital image. By combining an attribute code with a spatial code, the deep image manipulation system can generate a modified digital image with a modified attribute. As used herein, the term "attribute" refers to a visual, observable trait or characteristic of a digital image. For example, an attribute can include a degree or a size of a smile on a face within a digital image. An attribute can also include an amount of snow within a digital image. Other attributes include a size (e.g., a height and/or a width) of an object within a digital image, a color of an object within a digital image, and an amount (e.g., a coverage area) of a particular color or texture within a digital image.

Additional detail regarding the deep image manipulation system will now be provided with reference to the figures. For example, FIG. 1 illustrates a schematic diagram of an example system environment for implementing a deep image manipulation system 102 in accordance with one or more embodiments. An overview of the deep image manipulation system 102 is described in relation to FIG. 1. Thereafter, a more detailed description of the components and processes of the deep image manipulation system 102 is provided in relation to the subsequent figures.

As shown, the environment includes server(s) 104, a client device 108, a database 114, and a network 116. Each of the components of the environment can communicate via the network 116, and the network 116 may be any suitable network over which computing devices can communicate. Example networks are discussed in more detail below in relation to FIG. 17.

As mentioned, the environment includes a client device 108. The client device 108 can be one of a variety of computing devices, including a smartphone, a tablet, a smart television, a desktop computer, a laptop computer, a virtual reality device, an augmented reality device, or another computing device as described in relation to FIG. 17. Although FIG. 1 illustrates a single client device 108, in some embodiments the environment can include multiple different client devices, each associated with a different user. The client device 108 can communicate with the server(s) 104 via the network 116. For example, the client device 108 can receive user input from a user interacting with the client device 108 (e.g., via the client application 110) to, for example, select a digital image, edit a digital image, modify an attribute of a digital image, or generate a modified digital image. Thus, the deep image manipulation system 102 on the server(s) 104 can receive information or instructions to generate a modified digital image (e.g., by extracting and combining spatial codes and global codes) based on the input received by the client device 108.

As shown, the client device 108 includes a client application 110. In particular, the client application 110 may be a web application, a native application installed on the client device 108 (e.g., a mobile application, a desktop application, etc.), or a cloud-based application where all or part of the functionality is performed by the server(s) 104. The client application 110 can present or display information to a user, including a user interface for editing, manipulating, creating, or otherwise interacting with a digital image. Additionally, the client application 110 can present interactive elements in the form of buttons or tools selectable to edit a digital image or generate a new digital image. A user can interact with the client application 110 to provide user input to perform an operation as mentioned above, such as manipulating a digital image to modify an attribute.

As illustrated in FIG. 1, the environment includes the server(s) 104. The server(s) 104 may generate, track, store, process, receive, and transmit electronic data, such as digital images, spatial codes, global codes, and user interactions to manipulate digital images. For example, the server(s) 104 may receive data from the client device 108 in the form of a request to edit a digital image. In addition, the server(s) 104 can transmit data to the client device 108 to provide a modified digital image for display within a user interface of the client application 110. Indeed, the server(s) 104 can communicate with the client device 108 to transmit and/or receive data via the network 116. In some embodiments, the server(s) 104 comprises a distributed server where the server(s) 104 includes a number of server devices distributed across the network 116 and located in different physical locations. The server(s) 104 can comprise a content server, an application server, a communication server, a web-hosting server, or a machine learning server.

As shown in FIG. 1, the server(s) 104 can also include the deep image manipulation system 102 as part of a digital content editing system 106. The digital content editing system 106 can communicate with the client device 108 to perform various functions associated with the client application 110 such as extracting spatial codes, extracting global codes, and generating a modified digital image. In addition, the digital content editing system 106 and/or the deep image manipulation system 102 can learn parameters of a global and spatial autoencoder 112 by training an encoder neural network and a generator neural network of the global and spatial autoencoder 112 to extract spatial codes corresponding to geometric layout and global codes corresponding to overall appearance. In some embodiments, the digital content editing system 106 and/or the deep image manipulation system 102 can utilize a contrastive loss as part of the training process.

As further shown in FIG. 1, the environment includes a database 114. In particular, the database 114 can store information such as digital images, stored spatial codes, and stored global codes. Indeed, the database 114 can include a digital image code repository of spatial codes and global codes to utilize with the contrastive loss as part of the parameter learning process. In some embodiments, the database 114 also stores one or more components of the global and spatial autoencoder 112 such as an encoder neural network and/or a generator neural network.

Although FIG. 1 illustrates a particular arrangement of the environment, in some embodiments, the environment may have a different arrangement of components and/or may have a different number or set of components altogether. For instance, in some embodiments, the deep image manipulation system 102 may be implemented by (e.g., located entirely or in part) on the client device 108 and/or a third-party device. In addition, the client device 108 may communicate directly with the deep image manipulation system 102, bypassing the network 116. Further, the database 114 can be located external to the server(s) 104 (e.g., in communication via the network 116) or located on the server(s) 104 and/or on the client device 108.

Figure 2:
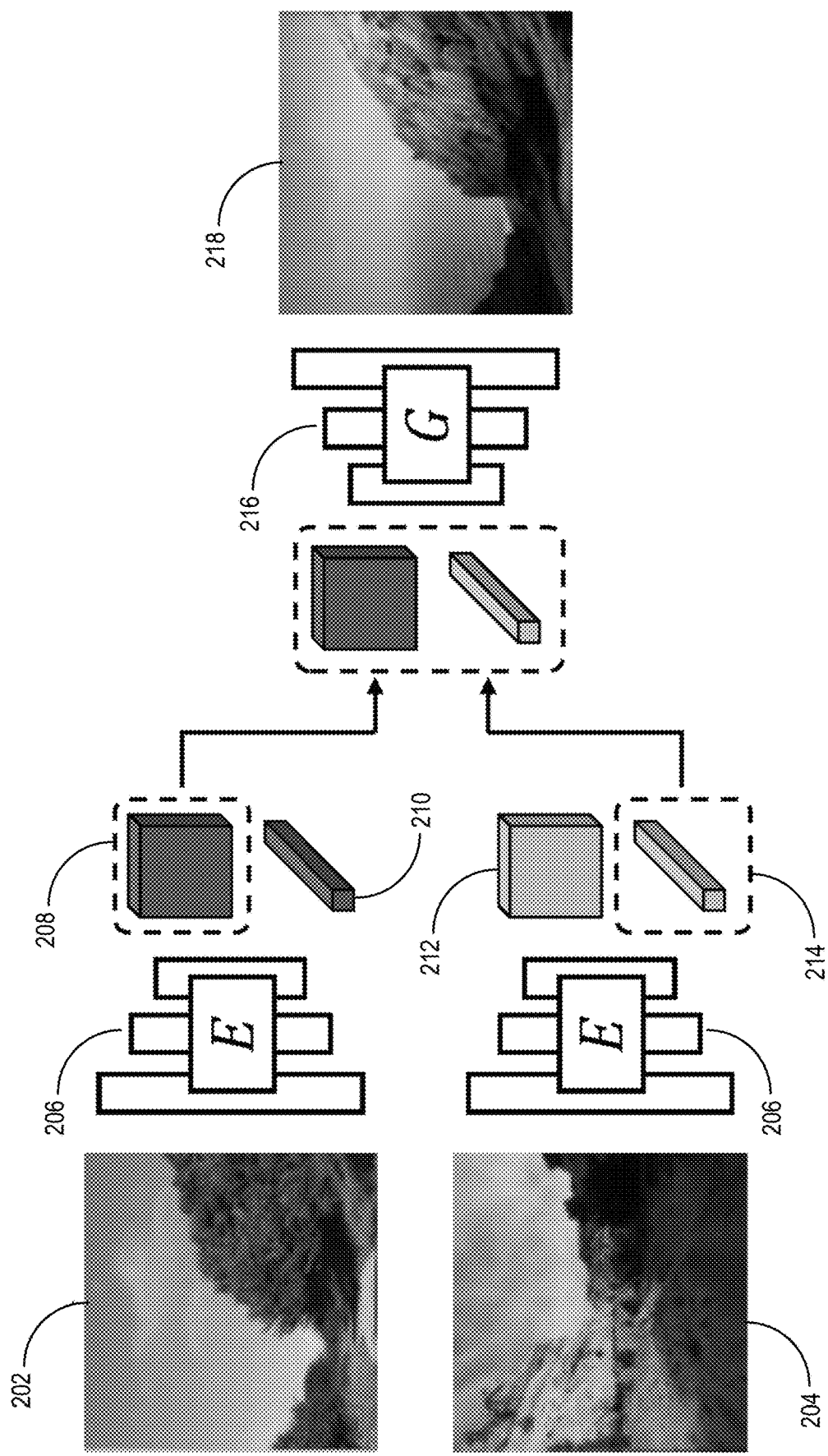
FIG. 2 illustrates an overview of generating a modified digital image utilizing a global and spatial autoencoder in accordance with one or more embodiments.

As mentioned, the deep image manipulation system 102 can generate a modified digital image by modifying one or more of a spatial code or a global code of a digital image. For example, the deep image manipulation system 102 can generate a modified digital image by combining a spatial code from a first digital image with a global code from a second digital image (or by combining a global code from a first digital image with a spatial code from a second digital image). In particular, the deep image manipulation system 102 can extract a spatial code and a global code from a first digital and a second digital image and can generate a modified digital image from a combination of swapped codes. FIG. 2 illustrates extracting spatial codes and global codes and generating a modified digital image 218 in accordance with one or more embodiments.

As illustrated in FIG. 2, the deep image manipulation system 102 utilizes a global and spatial autoencoder (e.g., the global and spatial autoencoder 112) that includes the encoder neural network 206 and the generator neural network 216 to generate the modified digital image 218 from the first digital image 202 and the second digital image 204. In particular, the deep image manipulation system 102 utilizes the encoder neural network 206 to extract a spatial code 208 and a global code 210 from the first digital image 202. Indeed, the deep image manipulation system 102 applies the encoder neural network 206 to the first digital image 202 to generate spatial features for the spatial code 208 and global features for the global code 210.

In a similar fashion, the deep image manipulation system 102 utilizes the encoder neural network 206 to extract the spatial code 212 and the global code 214 from the second digital image 204. More specifically, the deep image manipulation system 102 extracts spatial features from the second digital image 204 for the spatial code 212. In addition, the deep image manipulation system 102 extract global features from the second digital image 204 for the global code 214.

As shown in FIG. 2, the deep image manipulation system 102 can utilize the same encoder neural network 206 to extract the global and spatial codes from each of the first and second digital images 202, 204. In some embodiments, the deep image manipulation system 102 utilizes two separate encoders: a spatial encoder neural network to extract the spatial code 208 (and the spatial code 212) and a global encoder neural network to extract the global code 210 (and the global code 214).

In addition to extracting spatial codes and global codes, the deep image manipulation system 102 generates the modified digital image 218 by combining or otherwise modifying latent codes (e.g., the spatial and/or global code). For example, the deep image manipulation system 102 selects an extracted spatial code from one digital image (e.g., the first digital image 202 or the second digital image 204) and an extracted global code from another digital image (e.g., the other of the first digital image 202 or the second digital image 204) to combine together. Indeed, the deep image manipulation system 102 utilizes the generator neural network 216 to combine a first spatial code 208 (e.g., the spatial code 208 from the first digital image 202) with a second global code 214 (e.g., the global code 214 from the second digital image 204) to generate the modified digital image 218.

As a result of utilizing the first spatial code 208 and the second global code 214, the modified digital image 218 includes the geometric layout of the first digital image 202 with the overall appearance of the second digital image 204. Indeed, as shown in FIG. 2, the modified digital image 218 portrays a desert cliff scene with the shading and color scheme (with lots of tan and brown colors) of the second digital image 204 (from the global code 214) that also illustrates desert cliffs with a large shaded area. In addition, the modified digital image 218 has the shape or layout of the first digital image 202 (from the spatial code 208) that depicts a large round-shaped tree on the right side with smaller shrubbery on the left, tapering toward the middle of the image. Indeed, as shown, the modified digital image 218 has the same layout as the first digital image 202 with the rounded shape for the cliffs on the right and the smaller, tapering cliffs to the left.

In addition to generating the modified digital image 218 by swapping codes (e.g., swapping spatial codes and global codes between the first digital image 202 and the second digital image 204), the deep image manipulation system 102 can generate modified digital images by modifying latent codes to edit attributes or blend styles. Additional detail regarding style swapping, attribute editing, and style blending is provided below with reference to subsequent figures.

Figure 3:
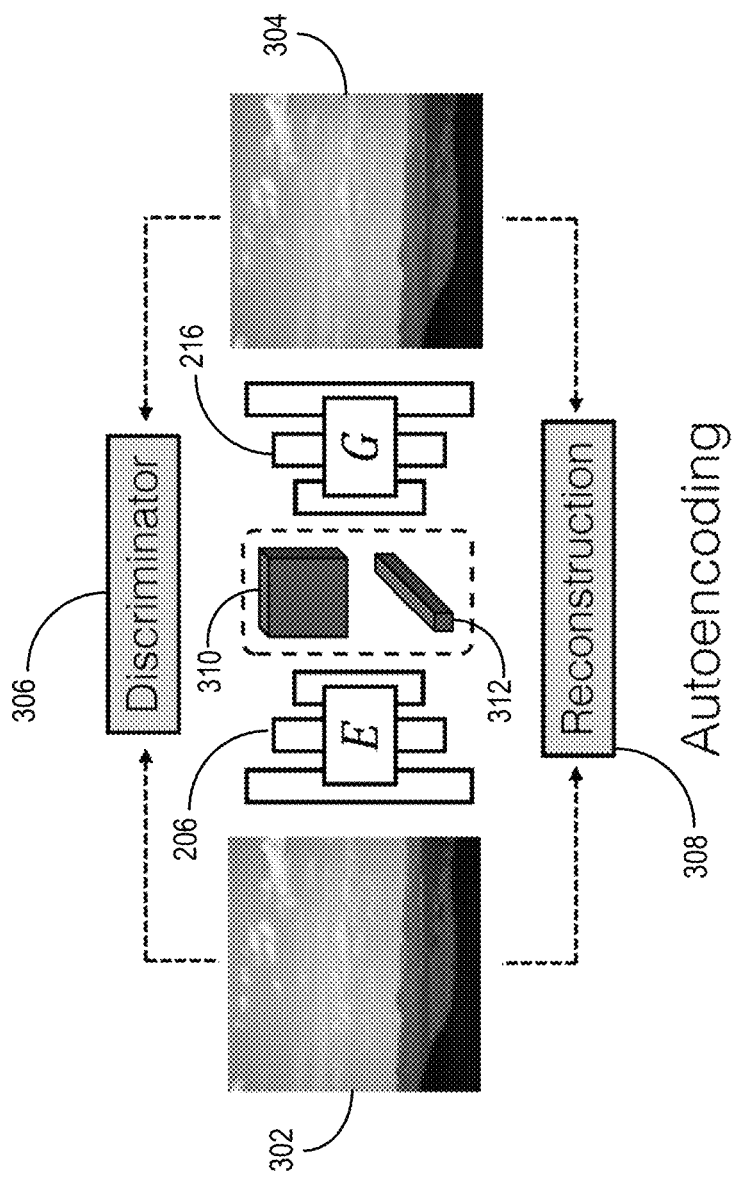
FIG. 3 illustrates an overview of learning parameters for a global and spatial autoencoder through digital image reconstruction in accordance with one or more embodiments.

To achieve the accuracy in generating a modified digital image (e.g., the modified digital image 218) from extracted spatial codes and extracted global codes, the deep image manipulation system 102 can learn parameters for the global and spatial autoencoder 112. In particular, the deep image manipulation system 102 can learn parameters for the encoder neural network 206 and the generator neural network 216 based on two different objectives: 1) to accurately reconstruct an input digital images and 2) to swap components (e.g., spatial codes and/or global codes) to generate a new hybrid digital image (sometimes referred to as "code swapping"). FIG. 3 illustrates an overview of a process of learning parameters for the encoder neural network 206 and the generator neural network 216 to generate a reconstructed digital image 304 from an input digital image 302 using an autoencoding technique in accordance with one or more embodiments.

As illustrated in FIG. 3, the deep image manipulation system 102 learns parameters for the global and spatial autoencoder 112 including the encoder neural network 206 and the generator neural network 216. As shown, the encoder neural network 206 (represented by the "E" in FIG. 3) maps the input digital image 302 to a latent space, and the generator neural network 216 does the reverse by generating a digital image (e.g., the reconstructed digital image 304) from a latent feature representation. In particular, encoder neural network 206 maps the input digital image 302 given by:

$$x \in \mathbb{R}^{H \times W \times 3}$$

where x represents the input digital image 302, H represents the height of the image, W represents the width of the image, and 3 is the number of channels in an RGB image. For example, the encoder neural network 206 maps the input digital image 302 to a latent space Z, and the generator neural network 216 generates the reconstructed digital image 304 from the encoding in the latent space Z. In some embodiments, the encoder neural network 206 (E) includes or represents two different encoders: a spatial encoder neural network $E_s$ and a global encoder neural network $E_g$ that extract spatial codes and global codes, respectively.

The deep image manipulation system 102 learns parameters of the encoder neural network 206 and the generator neural network 216 such as weights or other internal network parameters that enable the global and spatial autoencoder 112 to generate individual elements of latent code (e.g., spatial codes versus global codes) that represent disentangled factors of input digital images such as the input digital image 302 (e.g., so that factors are not represented by both the spatial codes and the global codes). To more explicitly ensure this disentanglement, the deep image manipulation system 102 factors the latent space Z into two components: a spatial code 310 and a global code 312. For example, the deep image manipulation system 102 generates a spatial code having the form:

$$z_s \in Z_s \cdot \mathbb{R}^{H_s \times W_s \times C_s}$$

and a global code having the form:

$$z_g \in Z_g \sim \mathbb{R}^{1 \times 1 \times C_g}$$

where $z_s$ represents a spatial code (e.g., the spatial code 310), $z_g$ represents a global code (e.g., the global code 312), $Z_s$ represents a spatial component of the latent space Z, $Z_y$ represents a global component of the latent space Z, $H_s$ represents a height of the spatial code, $W_S$ represents a width of the spatial code, $C_s$ represents a length of the spatial code, and $C_g$ represents a length of the global code. In some embodiments, the deep image manipulation system 102 implements a global code length $C_g$=1024, a spatial code length $C_S$=1 or 2, and a spatial dimensionality of 32 or 64, depending on the dataset of digital images.

To learn the parameters that allow the global and spatial autoencoder 112 to generate the reconstructed digital image 304 as an accurate representation of the input digital image 302, the deep image manipulation system 102 utilizes one or more loss functions. Indeed, with each iteration of analyzing a new input digital image to generate a reconstructed digital image as part of the parameter learning, the deep image manipulation system 102 utilizes loss functions to modify internal parameters of the encoder neural network 206 and/or the generator neural network 216. More specifically, the deep image manipulation system 102 utilizes loss functions to evaluate a performance of the global and spatial autoencoder 112 by determining an error or a measure of loss associated with generating a reconstructed digital image (e.g., the reconstructed digital image 304) from an input digital image (e.g., the input digital image 302). The deep image manipulation system 102 further modifies various weights or other internal parameters of the global and spatial autoencoder 112 based on the error or measure of loss utilizing gradient-based back propagation. Thus, over multiple iterations of analyzing new input digital images, generating corresponding reconstructed digital images, determining measures of loss, and modifying internal parameters of the encoder neural network 206 and the generator neural network 216 to reduce the loss, the deep image manipulation system 102 tunes the encoder neural network 206 and the generator neural network 216 to accurately generate reconstructed digital images from input digital images.

Relating to the loss functions, the deep image manipulation system 102 utilizes a reconstruction loss 308 to compare the reconstructed digital image 304 with the input digital image 302. In some embodiments, the deep image manipulation system 102 utilizes a reconstruction loss 308 in the form of:

$$\mathcal{L}_{rec,img}(E,G) = \mathbb{E}_{x \sim X}[\mathcal{L}_{percep}(x, G(E_s(x), E_g(X)))]$$

where $\mathcal{L}_{rec,img}(E,G)$ represents the reconstruction loss between the reconstructed digital image 304 (rec) and the input digital image 302 (img) associated the encoder neural network 206 (K) and the generator neural network 216 (G), x represents a latent code mapping of the input digital image 302 (as defined above), X denotes a training image distribution, $\mathcal{L}_{percep}$ represents a perceptual loss to determine a distance between pretrained deep network activations of the input digital image 302 and the reconstructed digital image 304, $E_s$ represents the spatial encoder neural network (as defined above), and $E_g$ represents the global encoder neural network (as defined above).

In addition to the reconstruction loss 308, the deep image manipulation system 102 can also utilize a GAN loss associated with a discriminator 306. To elaborate, during training, the deep image manipulation system 102 implements a discriminator 306 in competition with the generator neural network 216. Indeed, the generator neural network generates reconstructions, and the discriminator 306 attempts to distinguish generated reconstructions from actual stored data (e.g., from a digital image repository). For example, based on the input digital image 302, the generator neural network 216 generates the reconstructed digital image 304 which is provided to the discriminator 306. In turn, the discriminator 306 compares the reconstructed digital image 304 with an actual digital image from a database (e.g., the database 114) or a repository to identify or select which digital image is real (from the database).

In some embodiments, the deep image manipulation system 102 utilizes the GAN loss to further help the reconstructed digital image 304 look realistic, similar to the GAN loss described by Tero Karras, Samuli Laine, and Timo Aila in *A Style-Based Generator Architecture for Generative Adversarial Networks*, CVPR (2019), which is incorporated herein by reference in its entirety. Along with (or as part of) the GAN loss, the deep image manipulation system 102 simultaneously trains the discriminator 306 to identify if an image is generated by the generator neural network 216 or is from a real dataset. For example, the deep image manipulation system 102 utilizes a GAN loss given by:

$$\mathcal{L}_{GAN,direct}(E,G,D) = \mathbb{E}_{x \sim X}[\log(D(x)) + \log(1 - D(G(E(x))))]$$

where $\mathcal{L}_{GAN,direct}(E,G,D)$ represents the GAN loss, D represents the discriminator 306, and the remaining terms are defined above. As shown, the GAN loss is an adversarial loss. In some embodiments, the deep image manipulation system jointly trains the discriminator 306 (D) with a simplified gradient penalty regularization $\mathbb{E}_{x \sim X} \|\nabla_x D(x)\|_2$ and a default weight of 10.

By utilizing the GAN loss and the reconstruction loss 308, the deep image manipulation system 102 can determine how accurate the global and spatial autoencoder 112 is when generating reconstructed digital images and can improve the accuracy over subsequent iterations. For instance, the deep image manipulation system 102 continues training the encoder neural network 206 and the generator neural network 216 over multiple iterations, inputting new input digital images to generate new reconstructed digital images, determining losses, and modifying parameters for each iteration. Thus, upon determining that the GAN loss and/or the reconstruction loss 308 each satisfy a threshold loss, the deep image manipulation system 102 determines that the encoder neural network 206 and the generator neural network 216 are accurate. Indeed, by combining the extracted spatial code 310 and the extracted global code 312, the generator neural network 216 generates the reconstructed digital image 304 to accurately represent the input digital image 302. As shown in FIG. 3, the reconstructed digital image 304 looks very similar, if not identical, to the input digital image 302.

Figure 4:
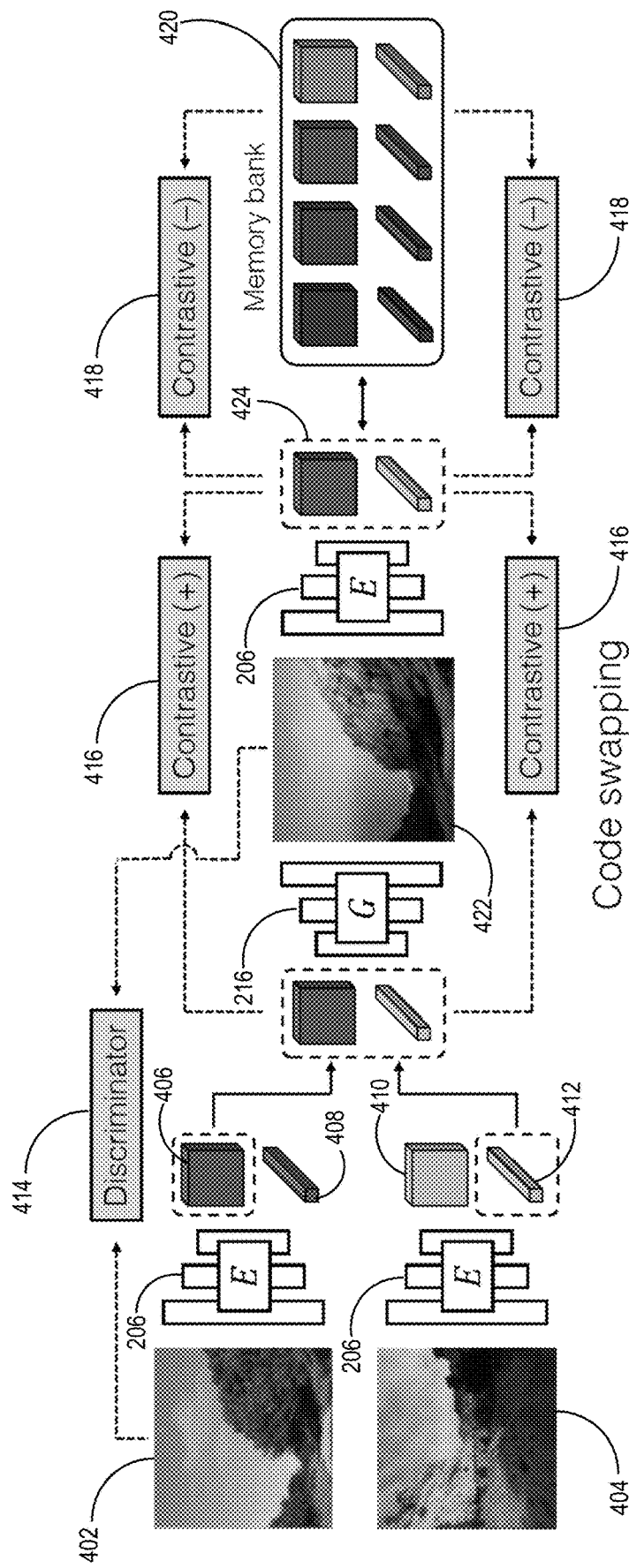
FIG. 4 illustrates an overview of learning parameters for a global and spatial autoencoder through generating a modified digital image for style swapping in accordance with one or more embodiments.

As mentioned, the deep image manipulation system 102 can learn parameters for the encoder neural network 206 and the generator neural network 216 that allow the global and spatial autoencoder to not only reconstruct an original image but allow to swap spatial and/or global codes to generate a hybrid modified digital image. In particular, the deep image manipulation system 102 learns to extract spatial codes and global codes that are accurate for reconstructing digital images but that are also accurate for mixing with codes of other digital images. FIG. 4 illustrates learning parameters that allow the encoder neural network 206 and the generator neural network 216 to generate a realistic appearing hybrid modified digital image (e.g., the modified digital image 218) from a first digital image 402 and a second digital image 404 using a code swapping technique in accordance with one or more embodiments.

As shown in FIG. 4, the deep image manipulation system 102 learns parameters for the global and spatial autoencoder 112 based on swapping spatial codes and global codes between pairs of digital images. To elaborate, the deep image manipulation system 102 utilizes the encoder neural network 206 to extract the spatial code 406 and the global code 408 from the first digital image 402. In addition, the deep image manipulation system 102 utilizes the encoder neural network 206 to extract the spatial code 410 and the global code 412 from the second digital image 404. As shown, the deep image manipulation system 102 generates the modified digital image 422 by utilizing the generator neural network 216 to combine the spatial code 406 from the first digital image 402 with the global code 412 from the second digital image 404.

Further, the deep image manipulation system 102 utilizes a GAN loss associated with the discriminator 414 to determine an error or a measure of loss associated with the global and spatial autoencoder 112 and to encourage realistic hybrid digital images. In particular, the deep image manipulation system 102 utilizes a GAN loss given by:

$$\mathcal{L}_{GAN,swap}(E,G,D) = \mathbb{E}_{x^0,x^1 \sim X}[\log(1 - D(G)(E_s(x^0), (x^1))))]$$

where $x^0$ represents a latent code representation of the first digital image 402, $x^1$ represents a latent code representation of the second digital image 404, and the other terms are defined above. In one or more embodiments, utilizing this GAN loss alone may not be enough for the deep image manipulation system 102 to constrain the global and spatial autoencoder 112 to generate a hybrid of the first digital image 402 and the second digital image 404, as the GAN loss is related only to the realism of the resultant digital image.

Thus, to improve the generation of hybrid digital images, the deep image manipulation system 102 can utilize an additional loss function called a contrastive loss. In particular, the deep image manipulation system 102 utilizes a code reconstruction loss to learn parameters for reconstructing the particular codes (e.g., the spatial code 406 and the global code 412) extracted from the first digital image 402 ($x^0$) and the second digital image 404 ($x^1$). However, unlike conventional systems that naively apply a reconstruction loss because they sample from a known distribution, the deep image manipulation system 102 extracts the latent vector with the encoder neural network 206 (rather than by sampling from a known distribution), and therefore, utilizes a different form of a code reconstruction loss. For instance, the deep image manipulation system 102 utilizes a code reconstruction loss referred to as a "contrastive loss" (which includes a positive contrastive loss component 416 and a negative contrastive loss component 418).

For the contrastive loss, the deep image manipulation system 102 shrinks the $\ell_2$ distance $\|E(G(z))-z\|_2^2 = \|E(G(E(x)))-E(x)\|_2^2$ by utilizing the encoder neural network 206 (E) to scale down the magnitude of its output space. Therefore, the deep image manipulation system 102 ensures that the reconstructed code 424 (e.g., a reconstructed spatial code and a reconstructed global code extracted from the modified digital image 422 utilizing the encoder neural network 206), as given by $\hat{z} = E(G(z))$, closely resembles (or matches) the extracted code z (e.g., the combination of the spatial code 406 and the global code 412) itself. More specifically, the deep image manipulation system 102 utilizes the contrastive loss to determine that the reconstructed code 424 closely resembles the extracted code z in proportion to other stored codes 420 within a memory bank (e.g., a digital image code repository within the database 114).

In other words, the deep image manipulation system 102 utilizes the positive contrastive loss component 416 to compare the reconstructed code 424 with the extracted code z (the spatial code 406 and the global code 412) and utilizes the negative contrastive loss component 418 to compare the reconstructed code 424 with stored codes 420 such as stored spatial codes and stored global codes within a digital image code repository. For example, the deep image manipulation system 102 compares a reconstructed spatial code with stored spatial codes and compares a reconstructed global code with stored global codes. Based on the comparisons, the deep image manipulation system 102 encourages the reconstructed code 424 to be more similar to the extracted code z than to the stored codes 420. In some embodiments, the deep image manipulation system 102 implements a contrastive loss of the form:

$$\mathcal{L}_{rec,code}(E, G) = \mathbb{E}_{z \sim Z}\left[-\log \frac{e^{\hat{z} \cdot z / \tau}}{e^{\hat{z} \cdot z / \tau} + \sum_{i=1}^{N} e^{\hat{z} \cdot \tilde{z}_i / \tau}}\right]$$

where the dot product "·" represents the cosine similarity, N represents a size of the digital image code repository (e.g., the number of stored codes 420 in the "Memory bank" of FIG. 4), $\tau=0.07$ is a "temperature" parameter, z represents the latent code for either the spatial or global components, E represents the spatial encoder neural network or the global encoder neural network, and $\tilde{z}_1, \tilde{z}_2, \ldots, \tilde{z}_N$ represent randomly drawn negative codes from the dataset (e.g., stored codes 420). In some embodiments, the deep image manipulation system 102 applies this contrastive loss to reconstructed digital images (e.g., the reconstructed digital image 304), swapped digital images (e.g., the modified digital image 422), and to each of the codes $z_s$ and $z_g$.

By utilizing the contrastive loss above, the deep image manipulation system 102 encourages $\hat{z}$ to be classified as z (or at least within a threshold similarity of z) amongst N+1 exemplar classes, where each class logit is formed by cosine similarity. In addition, minimizing this loss also serves as a maximizing a lower bound of mutual information between z and $\hat{z}$. Using the contrastive loss, the deep image manipulation system 102 prevents the generator neural network 216 from ignoring one of two codes (the spatial code 406 or the global code 412). Thus, the deep image manipulation system 102 helps ensure that the output of the generator neural network 216 contain traits of each of the two codes to be able to reconstruct them accurately.

In some embodiments, the deep image manipulation system 102 utilizes a particular training objective function to learn parameters of the encoder neural network 206 and the generator neural network 216 to accurately and realistically generate modified digital images in the form of hybrid digital images or reconstructed digital images. For example, the deep image manipulation system 102 utilizes a training objective function given by:

$$\underset{E,G}{\operatorname{argminmax}} \mathcal{L}_{GAN,direct}(E, G, D) +$$

$$\mathcal{L}_{GAN,swap}(E, G, D) + \lambda_{img}\mathcal{L}_{rec,img}(E, G) + \lambda_{code}\mathcal{L}_{rec,code}(E, G)$$

where $\lambda_{img}$ is an image reconstruction loss weight and $\lambda_{code}$ is a contrastive loss weight (or a code reconstruction loss weight) to control the importance of the image reconstruction loss and the contrastive loss, respectively. In some embodiments, $\lambda_{img}=0.1$ and $\lambda_{code}=1.0$. As a result of utilizing these losses together, the deep image manipulation system 102 not only improves the realism of generating modified (hybrid or reconstructed) digital images but also improves the accuracy of generating such digital images.

Figure 5:
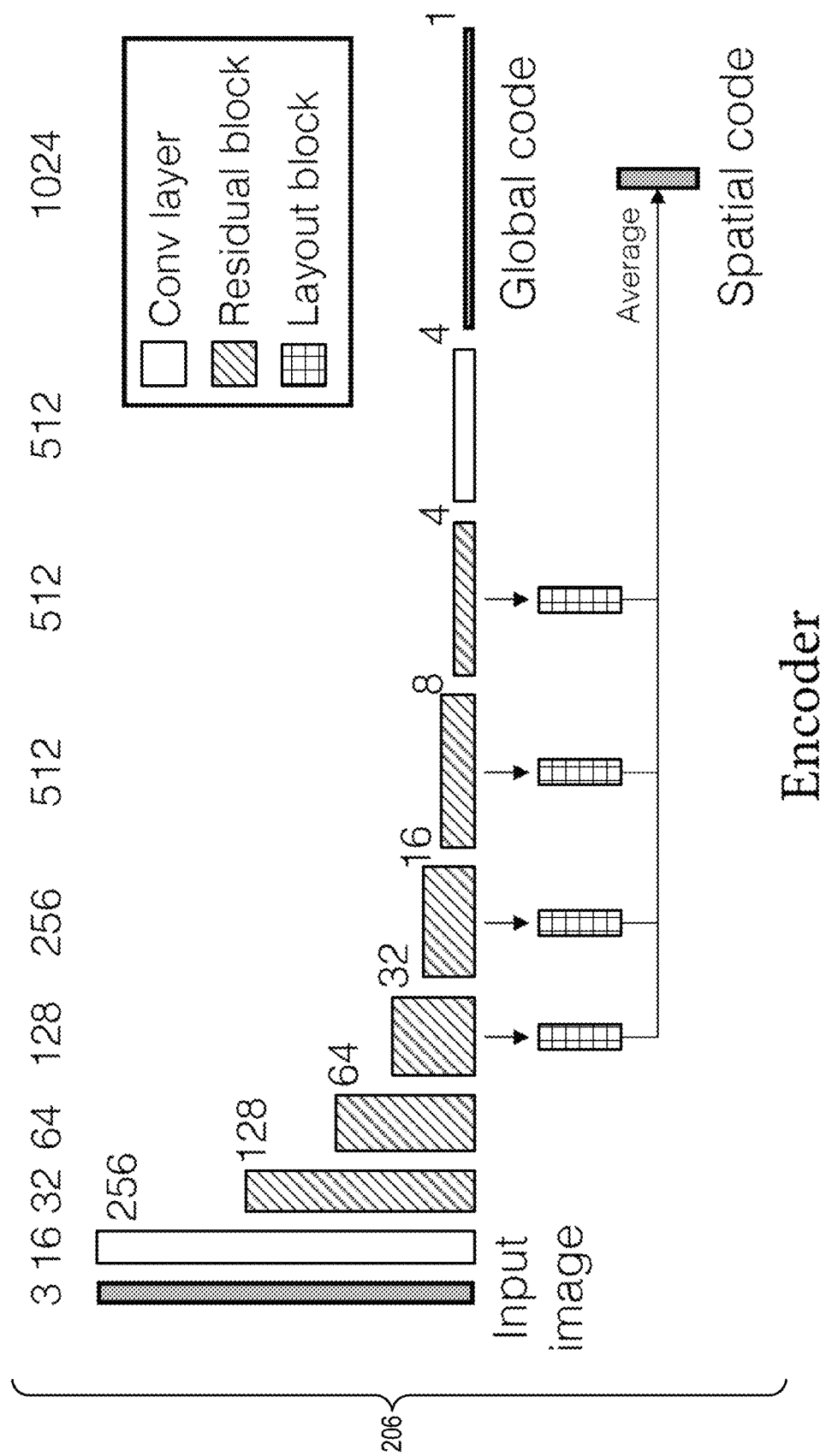
FIG. 5 illustrates an overview of architecture for an encoder neural network in accordance with one or more embodiments.

As mentioned above, the deep image manipulation system 102 utilizes a global and spatial autoencoder 112 with a novel architecture specifically for digital image manipulation. Indeed, the global and spatial autoencoder 112 includes the encoder neural network 206 and the generator neural network 216, each with its own architecture of constituent layers. FIG. 5 illustrates an overview of the architecture of the encoder neural network 206 in accordance with one or more embodiments.

As illustrated in FIG. 5, the encoder neural network 206 includes convolutional layers, residual blocks, and layout blocks. In particular, the key in FIG. 5 indicates that the white layers of the encoder neural network 206 are convolutional layers, the diagonally patterned blocks are residual blocks, and the crosshatch patterned blocks are layout blocks. In addition, the input digital image (e.g., 202, 204, 302, 402, 404, or 422) is represented by the tall gray block, the global code is represented by the short wide gray block, and the spatial code is represented by the medium height thin gray block. As mentioned above, the encoder neural network 206 includes a spatial encoder neural network and a global encoder neural network, which share common layers.

In FIG. 5, the vertical axis represents a spatial resolution while the horizontal axis represents channel dimensions. Thus, taller blocks have a higher spatial resolution and wider blocks have more channel dimensions. As illustrated in FIG. 5, each residual block of the main branch doubles the channel dimension (up to a max of 512) and halves the resolution until obtaining a latent feature vector of spatial resolution 4 with 512 channels. Ultimately, the encoder neural network 206 produces a global code with no spatial extent (e.g., no resolution or a negligibly small resolution) and 1024 channels.

In addition, the encoder neural network 206 generates the spatial code by passing intermediate (e.g., non-output) activations or latent features into layout blocks. Each layout block upsamples the latent feature vector to a fixed size (e.g., a spatial resolution of 32 or 64, depending on the dataset) and reduces the channel dimension (e.g., to 1 or 2 channels). The encoder neural network 206 further aggregates (e.g., averages) the intermediate features to generate the spatial code. In addition, the downsampling and upsampling operations of residual blocks and the layout blocks implement antialiasing.

Figure 6:
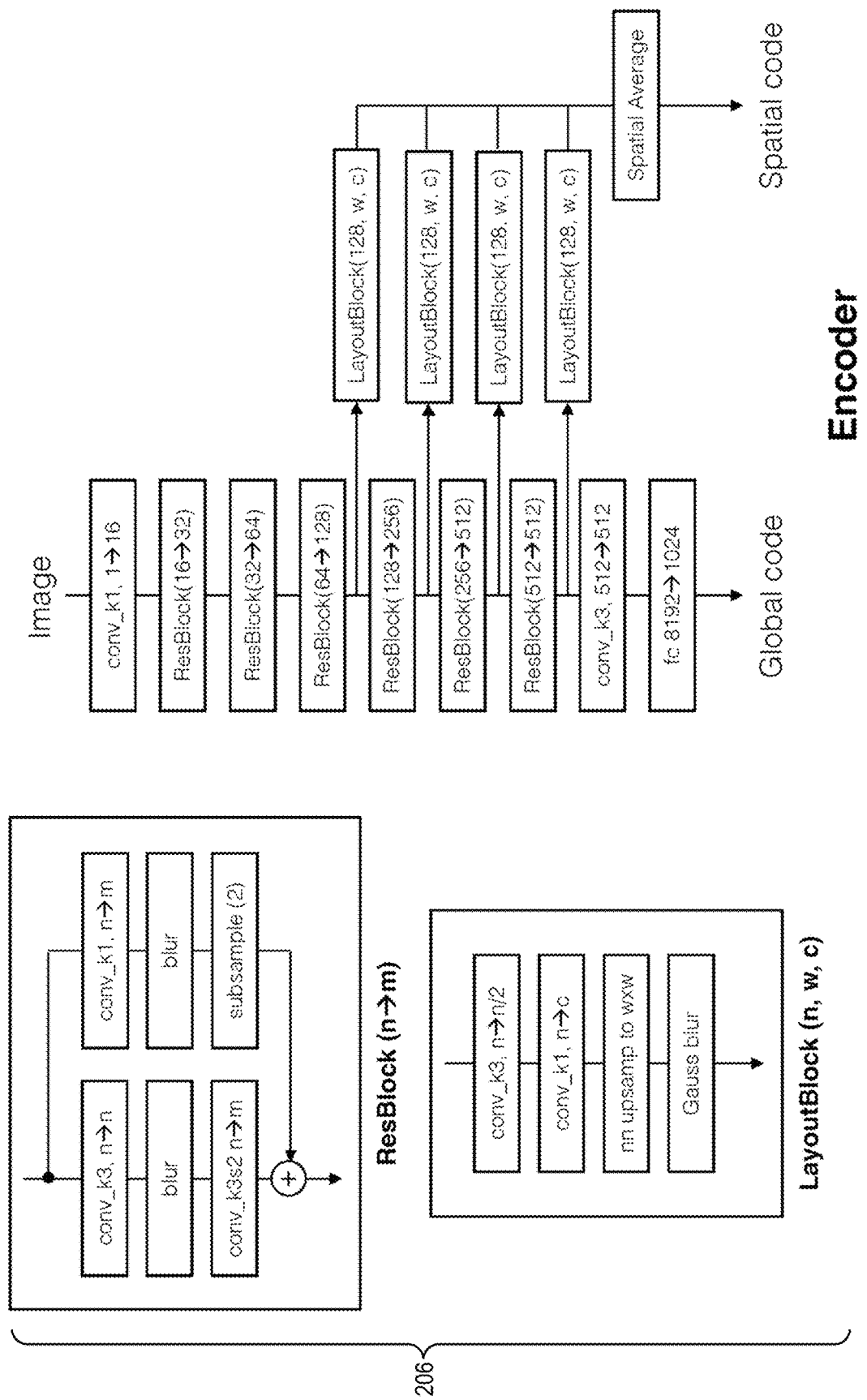
FIG. 6 illustrates a detailed view of architecture for an encoder neural network in accordance with one or more embodiments.

Continuing the description of the architecture of the encoder neural network 206, FIG. 6 illustrates a more detailed view of the architecture of the encoder neural network 206 in accordance with one or more embodiments. As illustrated in FIG. 6, the encoder neural network 206 includes the convolutional layers ("cony"), the residual blocks ("ResBlock"), the layout blocks ("LayoutBlock"), and a fully connected layer ("fc"), as outlined in relation to FIG. 5.

The encoder neural network 206 accepts an input digital image at a convolutional layer with kernel 1 and stride 1 (if no stride is indicated in FIG. 6, then the stride is 1), input channels 1, and output channels 16. For example, the input digital image has a resolution of 512×512 pixels or 256×256 pixels. An initial 1×1 convolution at the convolutional layer gives 16 output channels from that layer. From there, the subsequent layers are residual blocks that increase the channels from 16 to 32, from 32 to 64, and so on, doubling the channel dimension with each residual block 512 channels are reached. The encoder neural network 206 further includes a fully connected layer with 8192 input channels and 1024 output channels to generate the global code.

Further, the encoder neural network 206 includes layout blocks that accept intermediate activations to generate a spatial code. In particular, the encoder neural network 206 pushes intermediate residual block outputs (not final encoder outputs) through the layout blocks, whereupon the layout blocks upsample the feature map to the output layout size and reduce the number of channels. The encoder neural network 206 further averages the output of these layout blocks at each spatial position (e.g., pixel coordinate) to produce the spatial code. The layout spatial dimension (w) and the channel dimension (c) are different for particular datasets—e.g., they are 32 and 2, respectively, for the LSUN bedrooms and LSUN cars datasets, 64 and 1 for the landscapes dataset, and 32 and 1 for the FlickrFaces-HQ ("FFHQ") dataset.

In addition, FIG. 6 provides internal details for constituent components of the residual blocks and the layout blocks. As shown, a residual block includes a convolutional layer of kernel 3 and stride 1, followed by a blur layer and another convolutional layer of kernel 3 and stride 2. The encoder neural network 206 combines the output of this convolution layer with the output of the other branch of the residual block that includes a convolutional layer of kernel 1 and stride 1, a blur layer, and a subsample layer. As shown, each convolutional layer of a residual block is followed by a LeakyReLU blur layer for antialiasing pooling.

As further illustrated in FIG. 6, a layout block includes constituent layers such as a convolutional layer of kernel 3 and stride 1 (to half the number of channels), a convolutional layer of kernel 1 and stride 1, an upsample layer, and a Gaussian blur layer. The encoder neural network 206 utilizes the Gaussian blur to anti-alias after upsampling, with a blur kernel equal $\sigma$ to 0.8× the upsampling factor.

Figure 7:
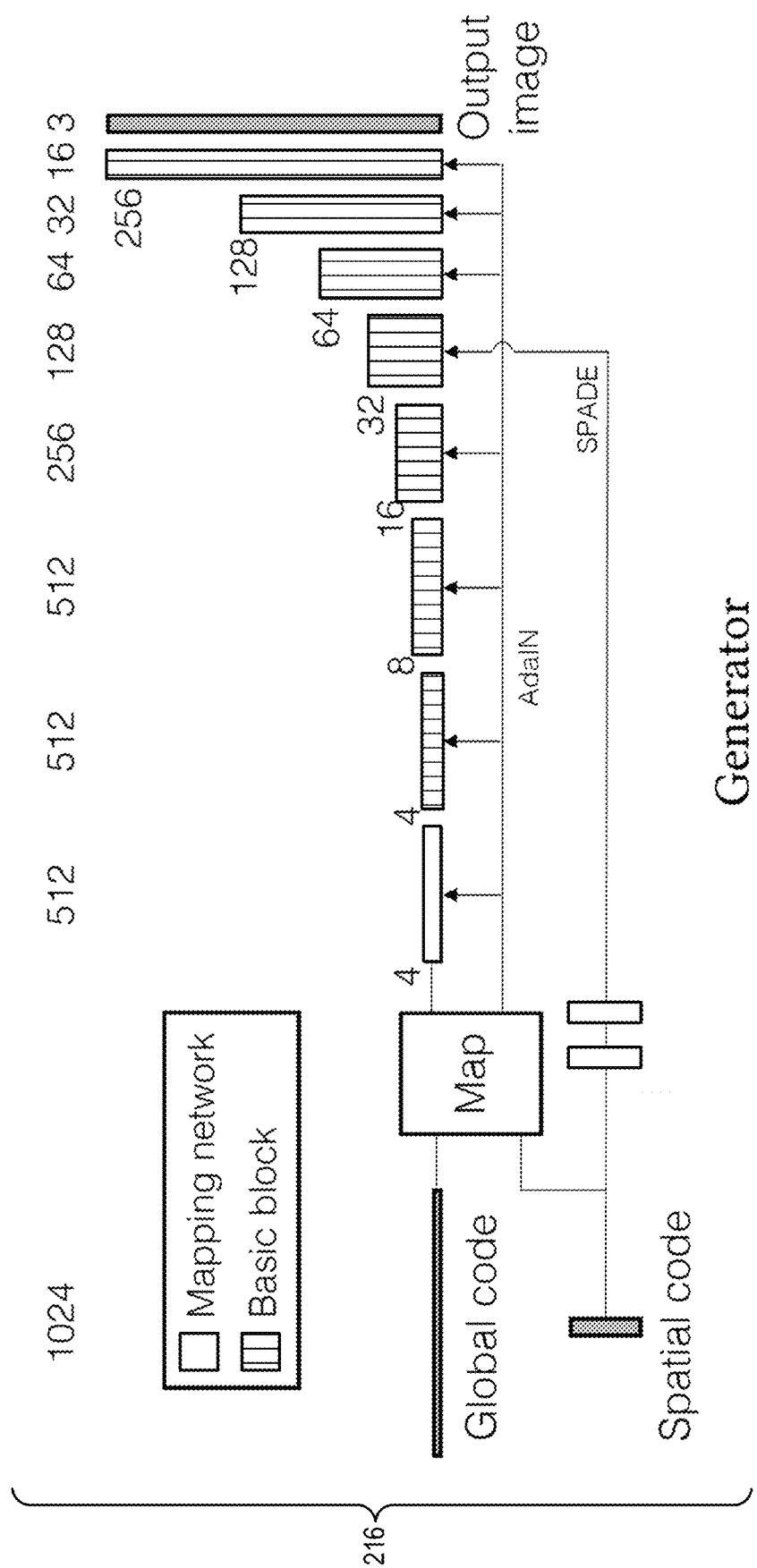
FIG. 7 illustrates an over of architecture for a generator neural network in accordance with one or more embodiments.

In addition to the encoder neural network 206, the global and spatial autoencoder 112 also includes a generator neural network 216. FIG. 7 illustrates an overview of the architecture of the generator neural network 216 in accordance with one or more embodiments. As shown, the generator neural network 216 includes a mapping block and a number of basic blocks. The key in FIG. 7 indicates that the mapping block ("Map") is blank and the basic blocks are vertically lined. Like FIG. 5, the vertical axis in FIG. 7 represents a spatial resolution while the horizontal axis represents channel dimensions. Thus, the basic blocks in the generator neural network 216 increase the spatial resolution and decrease the channel dimensions to generate the output digital image (e.g., the modified digital image). In addition, each of the basic blocks is modulated by an adaptive instance normalization block which scales and shifts activation (which is effective for image generation across multiple settings).

The generator neural network 216 determines the scale and shift parameters from the mapping block based on the global code and the spatial code. In particular, the generator neural network 216 predicts spatially varying shifts and biases and injects the shifts and biases into a corresponding layer which has the same resolution as the spatial code. Indeed, the generator neural network 216 utilizes spatially adaptive denormalization ("SPADE") to determine shifts and biases at each spatial location and to multiply the shifts and biases into corresponding basic blocks. In some embodiments, the generator neural network 216 follows many design principles from the model described by Karras et al., which was previously incorporated by reference above.

Figure 8:
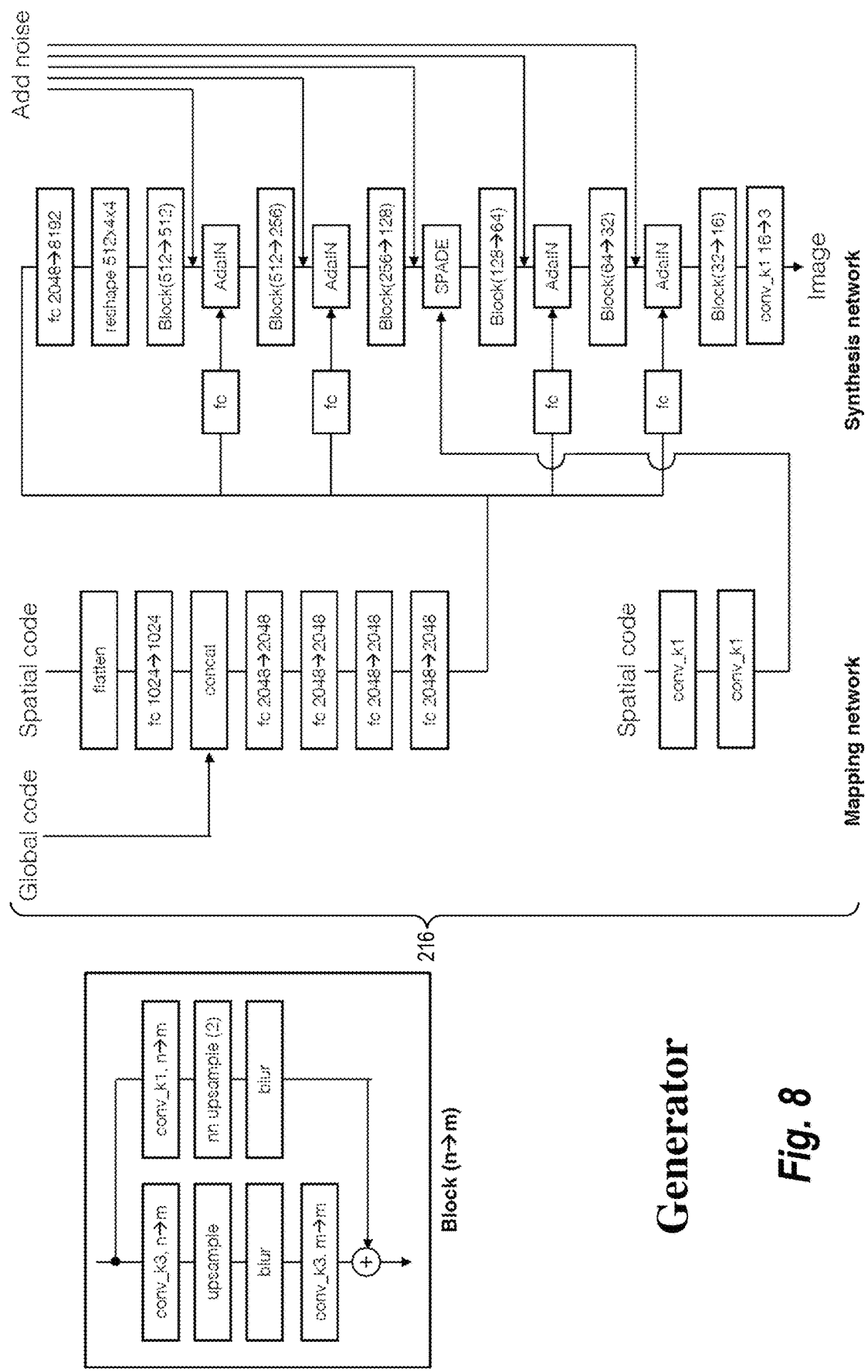
FIG. 8 illustrates a detailed view of architecture for a generator neural network in accordance with one or more embodiments.

Continuing the description of the architecture of the generator neural network 216, FIG. 8 illustrates a more detailed view of the architecture of the generator neural network 216 in accordance with one or more embodiments. As illustrated in FIG. 8, the generator neural network 216 includes a mapping block (the "Mapping network") that includes the blocks shown above the "Mapping network" label in FIG. 8. The mapping block modulates the main synthesis network of basic blocks ("Block"). Particularly, the generator neural network 216 passes the latent code through a series of fully connected layers to predict AdaIN parameters. The 32×32 spatial code has spatial extent, and the generator neural network 216 thus flattens the spatial code ("flatten") to put it through a fully connected layer to become a length 1024 feature vector to merge with the global code vector of length 1024 through concatenation ("concat").

As mentioned above, the generator neural network 216 determines scale and shift parameters to scale and shift activations. To do so, the generator neural network 216 utilizes the main trunk of the network (the "Synthesis network") to upsample spatially and to reduce channels through the "Block"s. In particular, the generator neural network 216 applies AdaIN at all layers except one layer which instead uses SPADE for different scale and bias parameters (predicted from the spatial code). The AdaIN applies the same shift and bias across all spatial locations. In some embodiments, the deep image manipulation system 102 also injects random noise at each layer which the generator neural network 216 can use to synthesize higher frequency data.

By utilizing the global and spatial autoencoder 112 with the above-described architecture for the encoder neural network 206 and the generator neural network 216, the deep image manipulation system 102 is more efficient than conventional systems by requiring few (e.g., one) examples only at run-time rather than requiring retraining for each new application. In addition, the deep image manipulation system 102 is more flexible than conventional systems because the global and spatial autoencoder is adaptive to generate particular digital images and to manipulate digital images through various types of applications.

Figure 9:
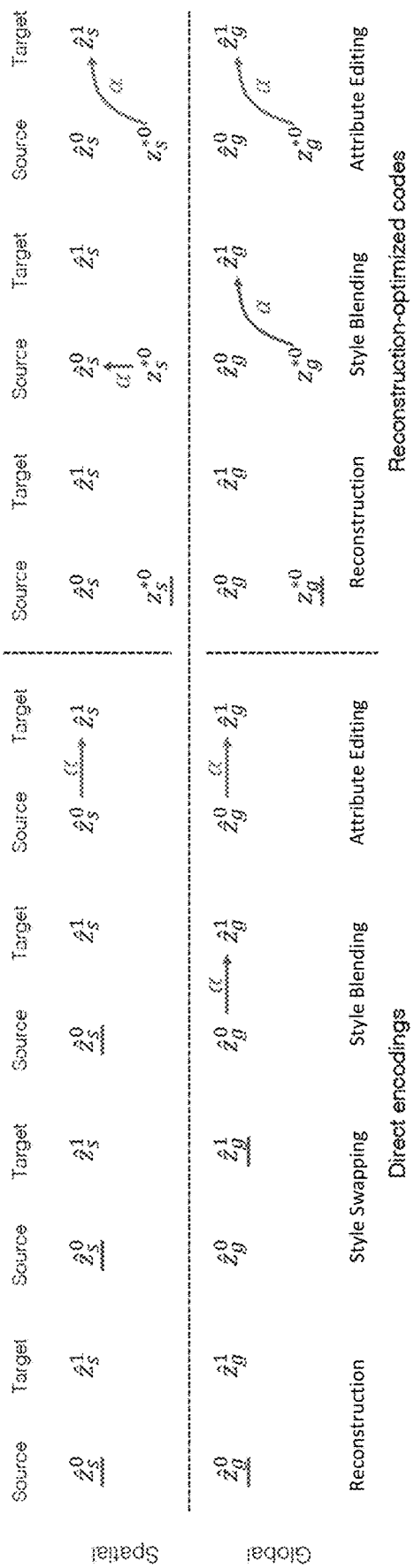
FIG. 9 illustrates manipulation paths for manipulating digital images for different applications in accordance with one or more embodiments.

As mentioned, the deep image manipulation system 102 can generate modified digital images in several applications including reconstruction, style swapping, style blending, and attribute editing. In particular, the deep image manipulation system 102 can utilize the global and spatial autoencoder 112 to reconstruct an input digital images, swap styles between pairs of digital images, blend styles between digital images, or edit attributes of a digital image. FIG. 9 illustrates manipulation paths for utilizing the global and spatial autoencoder 112 for these different applications in accordance with one or more embodiments. Example illustrations of the various applications are shown below with reference to subsequent figures.

As illustrated in FIG. 9, the deep image manipulation system 102 can perform various operations in relation to latent code of a first digital image ("Source") and latent code of a second digital image ("Target"). By varying the manipulation strategies of the spatial codes and global codes, the deep image manipulation system 102 can achieve the various applications described above, even when learning parameters utilizing only with reconstruction and swapping operations. Indeed, the deep image manipulation system 102 is more flexible than conventional systems in its ability to manipulate digital images in several ways despite only training with reconstruction and swapping techniques. Thus, the deep image manipulation system 102 can avoid the need to retrain for the different specific applications.

On the left side of FIG. 9 (to the left of the vertical dashed lines), the deep image manipulation system 102 performs various operation on outputs of the encoder neural network 206 (e.g., variants of 2). The deep image manipulation system 102 can perform these operations quickly, as they only require a feed-forward pass of the encoder neural network 206 and the generator neural network 216. For a small edit where a more detailed modified digital image is necessary, the deep image manipulation system 102 can modify the spatial codes and/or global codes for better reconstruction (e.g., variants of z*). On the right side of FIG. 9 (to the right of the vertical dashed lines), the deep image manipulation system 102 integrates or applies the modified codes for best results.

For digital image reconstruction, the deep image manipulation system 102 passes $\hat{z}_s^0$ and $\hat{z}_g^0$ through the generator neural network 216. Indeed, as shown in FIG. 9 (in the "Reconstruction" section) by the underlining of the $\hat{z}_s^0$ and the $\hat{z}_g^0$, the deep image manipulation system 102 selects the spatial code from a source digital image and further selects the global code from the same source digital image. From the spatial code and the global code, the deep image manipulation system 102 generates a reconstructed digital image in accordance with:

$$\text{Reconstruct}(x_0) \triangleq G(\hat{z}_s^0, \hat{z}_g^0)$$

where $x_0$ is a latent feature representation of the input (e.g., "Source") digital image, G represents the generator neural network 216, $\hat{z}_s^0$ is the spatial code from the input digital image, and $\hat{z}_g^0$ is the global code from the source digital image.

As mentioned above, the deep image manipulation system 102 can also utilize the global and spatial autoencoder 112 to perform a style swapping application. In particular, the deep image manipulation system 102 extracts spatial and global codes from a source digital image and a target digital image utilizing the encoder neural network 206. The deep image manipulation system 102 further utilizes the generator neural network 216 to generate a modified (hybrid) digital image from a spatial code from one digital image and a global code from the other. For instance, as shown in FIG. 9 (in the "Style swapping" section), the deep image manipulation system 102 utilizes the global and spatial autoencoder 112 to generate a modified digital image from the underlined codes: $\hat{z}_s^0$ and $\hat{z}_g^1$. Indeed, the deep image manipulation system 102 generates the modified digital image in accordance with:

$$\text{Swap}(x_0, x_1) \triangleq G(\hat{z}_s^0, \hat{z}_g^1)$$

where $x_0$ is a latent feature representation of a first (e.g., "Source") digital image, $x_1$ is a latent feature representation of a second (e.g., "Target") digital image, G represents the generator neural network 216, $\hat{z}_s^0$ represents a spatial code from the source digital image, and $\hat{z}_g^1$ represents a global code from the target digital image.

In addition to reconstruction and style swapping, the deep image manipulation system 102 can also utilize the global and spatial autoencoder 112 (trained only on the reconstruction and style swapping) for additional applications such as style blending. More specifically, the deep image manipulation system 102 can blend styles represented by global codes of multiple target digital images with the geometric layout of a source digital image. Within the "Style blending" section of FIG. 9, the target digital image (and its corresponding latent feature representation $x_1$) refers to a collection digital images rather than a single digital image, and $\hat{z}_s^1$ and $\hat{z}_g^1$ refer to average codes from that collection. Indeed, the deep image manipulation system 102 extracts the spatial codes and the global codes from the collection of digital images and combines them to generate a composite (e.g., average) spatial code and a composite (e.g., average) global code. The deep image manipulation system 102 thus generates a modified digital image by combining the composite global code with a source spatial code.

In some embodiments, rather than transferring global information by combining the composite global code $\hat{z}_g^1$ with the spatial code $\hat{z}_s^0$, the deep image manipulation system 102 utilizes a continuous slider variable a. In particular, the deep image manipulation system 102 utilizes the slider variable a to modify the weight or the effect of the composite global code $\hat{z}_g^1$ in generating a modified digital image. Indeed, in some embodiments, the deep image manipulation system 102 normalizes the latent codes (the global code and the spatial code) on the unit sphere and utilizes spherical linear interpolation (e.g., a "slerp" function), as given by:

$$\text{slerp}(z^0, z^1, \alpha) = \text{UnitNormalize}((1-\alpha)z^0 + \alpha z^1)$$

where $z^0$ is the latent code (the spatial code and the global code) for the source digital image, $z^1$ is the latent code for the target digital image, and a is the slider variable.

For instance, the deep image manipulation system 102 interpolates between the global code from the source digital image and the global code from the target digital image utilizing the slider variable. Indeed, the deep image manipulation system 102 generates a modified composite global code by determining a relative weight or emphasis for the source global code versus the target global code and by mixing or blending the codes based on the weight (as determined via the slider variable).

As shown in FIG. 9, for instance, the deep image manipulation system 102 utilizes the slider variable a to interpolate between the source global code $\hat{z}_g^0$ and the target global code $\hat{z}_g^1$ to produce a modified composite global code for combining with the source target code $\hat{z}_s^0$ (underlined). In some embodiments, the deep image manipulation system 102 interpolates between the source global code and the target global code in accordance with:

$$\bar{z}_g^\alpha = \text{slerp}(\hat{z}_g^0, \hat{z}_g^1, \alpha)$$

where $\bar{z}_g^\alpha$ is a modified composite global code, is the source global code, $\hat{z}_g^1$ is the composite global code from the collection of digital images, and a is the slider variable.

Based on generating the modified composite global code, the deep image manipulation system 102 further blends or mixes the composite global code with the spatial code from the source digital image to generate a modified digital image. In particular, the deep image manipulation system 102 blends the codes in accordance with:

$$\text{Mix}(x_0, x_1, \alpha) \triangleq G(\hat{z}_s^0, \bar{z}_g^\alpha)$$

where $x_0$ is the latent feature representation of the source digital image, $x_1$ is the latent feature representation of the target digital image, G represents the generator neural network 216, a is the slider variable, $\hat{z}_s^0$ is the source spatial code, and $\bar{z}_g^\alpha$ is the modified composite global code. Using the above mixing or blending, when $\alpha=0$, the deep image manipulation system 102 generates a reconstructed source digital image, and when $\alpha=1$, the deep image manipulation system 102 generates style swapping results as described above, as given by:

$$\text{Mix}(x_0, x_1, 0) = \text{Reconstruct}(x_0)$$

$$\text{Mix}(x_0, x_1, 1) = \text{Swap}(x_0, x_1)$$

where the variables are as defined above. Advantageously, the deep image manipulation system 102 exhibits this emergent property where, even though only a single digital image is swapped during training, the learned code is smooth and generalizes to combinations of global codes, either between multiple target digital images or the original source digital image. In some embodiments, the deep image manipulation system 102 receives user input (e.g., from the client device 108) to adjust or modify the slider variable a for different style blending.

As mentioned, the deep image manipulation system 102 can further apply the global and spatial autoencoder 112 for attribute editing. In particular, the deep image manipulation system 102 can edit a particular attribute of a digital image by combining various latent codes. For example, the deep image manipulation system 102 extracts latent codes from one or more digital images that depict a particular attribute (e.g., a smiling face or a snowy landscape). The deep image manipulation system 102 further extracts latent codes from one or more of digital images that do not depict the particular attribute (e.g., a non-smiling face or a snow-less landscape). Additionally, the deep image manipulation system can generate an attribute direction by determining a difference between the latent codes of the two groups of digital images. Moving a spatial code or a global code in the attribute direction increases the attribute, while moving a spatial code or global code in a direction opposite to the attribute direction reduces the presence of the attribute in a resulting image. Indeed, the deep image manipulation system 102 determines attribute directions by determining directions of latent codes such as spatial codes and global codes.

As illustrated in FIG. 9 (in the "Attribute editing" section), the deep image manipulation system 102 utilizes the spatial code and the global code of the source digital image as well as the spatial code attribute direction and the global code attribute direction determined from a collection of the target digital images to perform an attribute editing operation. Particularly, the deep image manipulation system 102 generates attribute directions based on the difference between codes of images that depict an attribute and codes of images, that do not depict the attribute. For example, the deep image manipulation system 102 generates the attribute directions:

$$\hat{z}^1 = \{\hat{z}_s^1, \hat{z}_g^1\}$$

where $\hat{z}^1$ is the overall latent attribute direction, $\hat{z}_s^1$ is a spatial attribute direction, and $\hat{z}_g^1$ is a global attribute direction.

The deep image manipulation system 102 further generates a modified or hybrid spatial code by modifying the source spatial code in the spatial attribute direction $\hat{z}_s^1$ by a given magnitude α. Likewise, the deep image manipulation system 102 generates a modified or hybrid global code by modifying the source global code in the global attribute direction by the given magnitude α. More particularly, the deep image manipulation system 102 utilizes a spherical linear interpolation ("slerp") function with a slider variable (e.g., α) to weight to move the latent codes in the attribute directions. For example, the deep image manipulation system 102 modifies spatial code and global codes in accordance with:

$$\bar{z}_s^\alpha = \text{slerp}(\hat{z}_s^0, \hat{z}_s^1, \alpha)$$

and $$\bar{z}_g^\alpha = \text{slerp}(\hat{z}_g^0, \hat{z}_g^1, \alpha)$$

where $\bar{z}_s^\alpha$ is the modified spatial code, $\bar{z}_g^\alpha$ is the modified global code (or the modified composite global code for cases where multiple extracted codes are combined together), $\hat{z}_s^0$ is the source spatial code, $\hat{z}_s^1$ is the spatial attribute direction (for depicting or not depicting a particular attribute), $\hat{z}_g^0$ is the source global code, $\hat{z}_g^1$ is the target attribute direction (for depicting or not depicting a particular attribute), and a is the slider variable or magnitude.

In addition, the deep image manipulation system 102 utilizes the modified codes $\bar{z}_s^\alpha$ and $\bar{z}_g^\alpha$ to generate modified digital image. In particular, the deep image manipulation system 102 combines the modified codes utilizing the generator neural network 216. For instance, the deep image manipulation system 102 performs the attribute editing in accordance with:

$$\text{Attribute}(x_0, \hat{z}^1, \alpha) \triangleq G(\bar{z}_s^\alpha, \bar{z}_g^\alpha, \alpha)$$

where $\hat{z}^1 = \{\hat{z}_s^1, \hat{z}_g^1\}$ is the attribute direction including the directions for depicting or not depicting a given attribute, $x_0$ is a latent feature representation of the source digital image, $\bar{z}_s^\alpha$ is the modified (composite) spatial code, $\bar{z}_g^\alpha$ is the modified (composite) global code, and a is the slider variable.

In some embodiments, the deep image manipulation system 102 receives user input (e.g., from the client device 108) to adjust or modify the slider variable a for different attribute editing—e.g., for different degrees of change for the particular attribute. Generally, when α is small, the deep image manipulation system 102 more closely reproduces the source digital image. However, while the deep image manipulation system 102 trains the global and spatial autoencoder 112 with a reconstruction loss, the match is not always exact. In these cases, the deep image manipulation system 102 treats the original encoding as an initialization and performs an addition iterative optimization (at test time) over the latent code to find a better match, as given by:

$$z^{*0} = \underset{z}{\arg\min}(x_0, G(z))$$

where $z^{*0}$ is the reconstruction-optimized latent code for the source digital image, and the other variables are as defined above. For the target digital image (represented by the latent code $x_1$), however, the deep image manipulation system 102 does not perform test time optimization. The style swapping operation is thus unaffected.

As illustrated in FIG. 9 (on the right side of the vertical dashed lines), the deep image manipulation system 102 utilizes the reconstruction-optimized latent code $z^{*0}$ for various applications such as reconstruction, style blending, and attribute editing. Indeed, when α is small, the deep image manipulation system 102 utilizes the reconstruction-optimized latent code $z^{*0}$ to prioritize digital image reconstruction of the source digital image (as indicated by the underlined codes in the "Reconstruction" section on the right side of FIG. 9).

As a increases (e.g., based on user input to manipulate a digital image), the deep image manipulation system 102 interpolates between optimized and original latent codes to generate mixed codes $\bar{z}_s^0$ and $\bar{z}_g^0$. For example, the deep image manipulation system 102 utilizes spherical linear interpolation to generate the mixed codes, as given by:

$$\bar{z}_s^0 = \text{slerp}(\hat{z}_s^0, \hat{z}_s^{*1}, \alpha)$$

and $$\bar{z}_g^0 = \text{slerp}(\hat{z}_g^0, \hat{z}_g^{*0}, \alpha)$$

where $z_s^{*0}$ is the spatial component of the reconstruction-optimized latent code $z^{*0}$, $z_g^{*0}$ is the global component of the reconstruction-optimized latent code $z^{*0}$, $\hat{z}_s^0$ represents a spatial code from the source digital image, $\hat{z}_g^0$ represents a global code from the source digital image, and α is the slider variable to indicate how to weight between the codes for interpolation.

In some embodiments, the deep image manipulation system 102 interpolates from the mixed source code $\bar{z}_s^0$ to the target global code $\hat{z}_g^1$ in accordance with:

$$\bar{z}_s^\alpha = \text{slerp}(\bar{z}_s^0, \hat{z}_s^1, \alpha)$$

and $$\bar{z}_g^\alpha = \text{slerp}(\bar{z}_g^0, \hat{z}_g^1, \alpha)$$

where the variables are as defined above.

For style blending, the deep image manipulation system 102 keeps the source spatial code $z_s^{*0}$ as-is and interpolates the source global code $z_g^{*0}$ toward the target global code $\hat{z}_g^1$, as shown in the "Style blending" section on the right side of FIG. 9. Specifically, the deep image manipulation system 102 performs style blending in accordance with:

$$\text{Mix}^*(x_0, x_1, \alpha) \triangleq G(\bar{z}_s^0, \bar{z}_g^\alpha)$$

where the variables are as defined above.

For attribute editing, the deep image manipulation system 102 interpolates both the source spatial code $z_s^{*0}$ and the source global code $z_g^{*0}$, as shown in the "Attribute editing" section on the right side of FIG. 9. Specifically, the deep image manipulation system 102 performs attribute editing in accordance with:

$$\text{Attribute}^*(x_0, \hat{z}^1, \alpha) \triangleq G(\bar{z}_s^\alpha, \bar{z}_g^\alpha)$$

where the variables are as defined above.

In some embodiments, the deep image manipulation system 102 performs a step for generating one or more of an additional global code or an additional spatial code. The above description of FIG. 2 and the description of FIG. 9 are the various embodiments of the supporting acts and algorithms for performing the step for generating one or more of an additional global code or an additional spatial code. For example, the step for generating one or more of an additional global code or an additional spatial code can comprise the steps and algorithms for generating latent code(s) for style swapping in one embodiment, the steps and algorithms for generating latent code(s) for style bending in another embodiment, the steps and algorithms for generating latent code(s) for attribute editing in still another embodiment.

Figure 10:
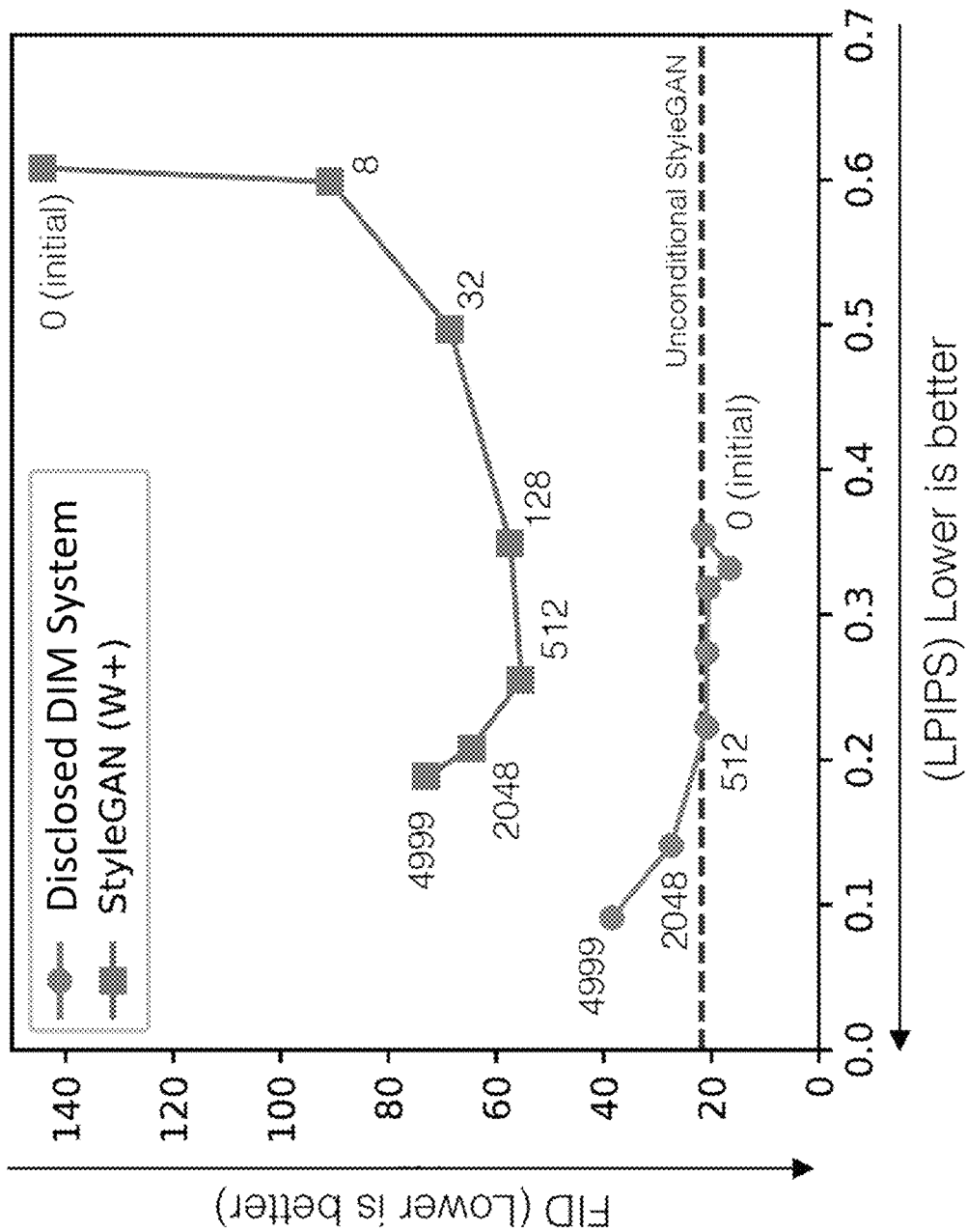
FIG. 10 illustrates a graph depicting accuracy improvements of the deep image manipulation system over conventional systems in accordance with one or more embodiments.

As mentioned, the deep image manipulation system 102 provides advantages in accuracy and efficiency over conventional digital image editing systems. Indeed, experimenters have demonstrated the improved accuracy and efficiency of the deep image manipulation system 102 through tests against a particular conventional system known as StyleGAN, which was previously incorporated by reference. FIG. 10 illustrates a graph portraying the accuracy and efficiency of the deep image manipulation system 102 ("disclosed DIM system") as compared to a version of StyleGAN in accordance with one or more embodiments. The graph in FIG. 10 includes an x-axis of reconstruction quality/accuracy and a y-axis of modified (hybrid) digital image generation quality/accuracy.

As illustrated in FIG. 10, lower values correspond to better accuracy on both axes. Comparing like points, the deep image manipulation system 102 provides better accuracy at initialization (the 0 point) and at each of the other points as well. Indeed, the deep image manipulation system 102 provides better learned perceptual image patch similarity ("LPIPS") and better Fréchet inception distance ("FID"). Likewise, the deep image manipulation system 102 provides better accuracy than StyleGAN (W+) for both measures after 8 iterations, 32 iterations, 128 iterations, 512 iterations, 2048 iterations, and 4999 iterations.

As mentioned, the deep image manipulation system 102 is not only more accurate than conventional systems but also more efficient. FIG. 11 illustrates a table of speed improvements of the deep image manipulation system 102 over a conventional system known as IM2StyleGAN, as described by Rameen Abdal, Yipeng Qin, and Peter Wonka in *Image2StyleGAN: How to Embed Images Into the StyleGAN Latent Space?*, In ICCV 2019 available at arXiv: 1904.03189 [cs.CV], in accordance with one or more embodiments. As illustrated in FIG. 11, the deep image manipulation system 102 provides far better running times than the conventional model. To generate the results for the table, experimenters utilized a common GPU for each model (e.g., NVIDIA V100) and averaged running time over 100 digital images for two different datasets: a 256×256 pixel LSUN bedroom dataset that includes approximately 70 million bedroom images and a 512×512 pixel landscape dataset that includes approximately 700,000 landscape images.

As shown, the results of the experiment demonstrate the speed improvement of the deep image manipulation system 102. For either the style swapping operation or the attribute editing operation, Im2StyleGAN exhibits the same computational cost, taking several minutes for each dataset (172.37 seconds or 366.50 seconds). On the contrary, the deep image manipulation system 102 achieves style swapping in real-time (or fast enough for real-time on-the-fly application in image editing) within 1 or 2 milliseconds. For attribute editing, the deep image manipulation system 102 takes a little longer but is still 6 to 10 times faster than Im2StyleGAN.

Figure 12:
FIG. 12 illustrates modified digital images generated utilizing style swapping in accordance with one or more embodiments.

As mentioned above, the deep image manipulation system 102 can generate modified digital images utilizing the global and spatial autoencoder 112 to swap styles of input digital images. In particular the deep image manipulation system 102 can extract spatial codes and global codes from digital images and can swap codes to combine a spatial code from one digital image with a global code from another digital image to generate a modified digital image. FIG. 12 illustrates generating modified digital images from source digital images and target digital images in accordance with one or more embodiments.

As illustrated in FIG. 12, the deep image manipulation system 102 generates modified digital images as combinations of source digital images and target digital images. In particular, the deep image manipulation system 102 extracts spatial codes from source digital images to maintain the content and geometric layout of the source digital images. In addition, the deep image manipulation system 102 extracts global codes from the target digital images to obtain the overall look or appearance of the target digital images. Further, the deep image manipulation system 102 utilizes the generator neural network 216 to combine spatial codes and global codes to generate the modified (hybrid) digital images shown at the cross-sections of the source digital images and the target digital images in FIG. 12.

The deep image manipulation system 102 accurately generates modified digital images that are realistic amalgamations of the source digital images and the target digital images. Indeed, as shown, the deep image manipulation system 102 combines the spatial features of Barack Obama with the global features of Chris Hemsworth to generate the top-left modified digital image, which is a realistic-looking generation of a portrait of an individual who is not actually real. Likewise, the deep image manipulation system 102 generates modified digital images by combining features of other source and target images as well, such as by combining features of Donald Trump with features of Scarlet Johansson or features of Hillary Clinton with features of Mark Ruffalo.

Not only is the deep image manipulation system 102 effective for actual photos, but the deep image manipulation system 102 can even generate modified digital images by effectively swapping styles of paintings or other digital images, which is something that conventional systems struggle to do effectively. Indeed, the bottom row of FIG. 12 illustrates the result of combining spatial features of a Van Gogh painting with global features of various celebrities.

Figure 13:
FIG. 13 illustrates modified digital images generated utilizing attribute editing in accordance with one or more embodiments.

As mentioned above, the deep image manipulation system 102 can further generate modified digital images by attribute editing. In particular, the deep image manipulation system 102 can determine an attribute direction in the latent space and can modify an attribute of a digital image based on the attribute direction by modifying the spatial and global codes, as described in more detail above. FIG. 13 illustrates results of generating modified digital images for attribute editing in accordance with one or more embodiments.

As illustrated in FIG. 13, the deep image manipulation system 102 modifies two different digital images—one of Mark Ruffalo and another of Hillary Clinton—from their original state (the center image) to edit the attribute corresponding to how much the face in the respective images is smiling. For instance, the deep image manipulation system 102 reduces a degree of smiling for the images to the left of center and increases the degree of smiling for the images to the right of center. In some embodiments, the deep image manipulation system 102 receives user input to determine how much to modify the attribute of a digital image. To modify the digital images as shown in FIG. 13, the deep image manipulation system 102 implements the attribute editing technique described above in relation to FIG. 9.

Figure 14:
FIG. 14 illustrates modified digital images generated utilizing style blending in accordance with one or more embodiments.

In addition to style swapping and attribute editing, the deep image manipulation system 102 can also generate a modified digital image by style blending. In particular, the deep image manipulation system 102 can blending styles of digital images by generating a composite global code from one or a plurality of digital images to combine with a spatial code of a source digital image. FIG. 14 illustrates generating modified digital images for style blending in accordance with one or more embodiments.

As illustrated in FIG. 14, the deep image manipulation system 102 blends the style of the target digital image in each row with the geometric layout of the corresponding source digital image. Indeed, the deep image manipulation system 102 generates modified digital images with varying degrees of style blending, with those to the right incorporating more of the style (from the global code) of the target digital image. In some embodiments, the deep image manipulation system 102 receives user input to determine how much to blend the style of a target digital image with the layout of a source digital image.

Figure 15:
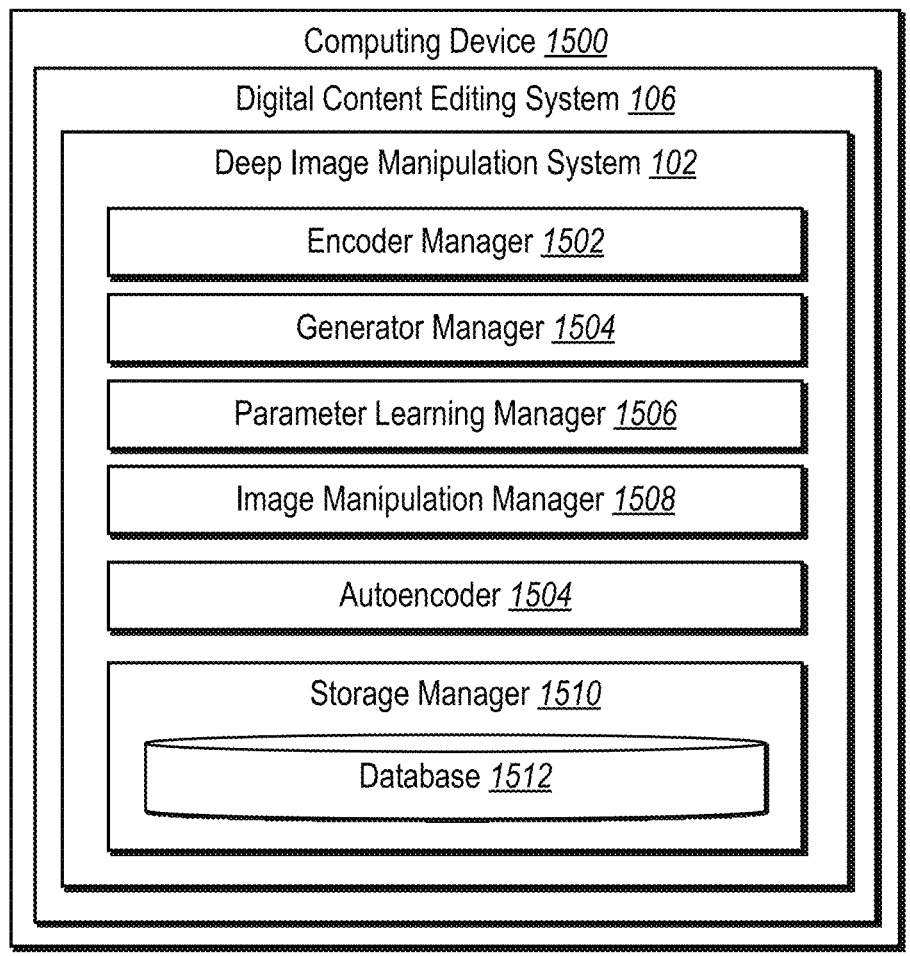
FIG. 15 illustrates a schematic diagram of a deep image manipulation system in accordance with one or more embodiments.

Looking now to FIG. 15, additional detail will be provided regarding components and capabilities of the deep image manipulation system 102. Specifically, FIG. 15 illustrates an example schematic diagram of the deep image manipulation system 102 on an example computing device 1500 (e.g., one or more of the client device 108 and/or the server(s) 104). As shown in FIG. 15, the deep image manipulation system 102 may include an encoder manager 1502, a generator manager 1504, a parameter learning manager 1506, an image manipulation manager 1508, an autoencoder 1504, and a storage manager 1510. The storage manager 1510 can operate in conjunction with or include one or more memory devices such as the database 1512 (e.g., the database 114) that store various data such as a first digital image, a second digital image, and a global and spatial autoencoder comprising an encoder neural network and a generator neural network.

As just mentioned, the deep image manipulation system 102 includes an encoder manager 1502. In particular, the encoder manager 1502 manages, maintains, stores, utilizes, implements, applies, or accesses the autoencoder 1504 (e.g., the encoder neural network 206). For instance, the encoder manager 1502 utilizes the encoder neural network to extract, generate, produce, determine, or identify a latent code (including a spatial code and/or a global code) from one or more digital images.

In addition, the deep image manipulation system 102 includes a generator manager 1504. In particular, the generator manager 1504 manages, maintains, stores, utilizes, implements, applies, or accesses a generator neural network (e.g., the generator neural network 216). For instance, the generator manager 1504 utilizes the generator neural network to generate a digital image such as a modified digital image or a reconstructed digital image. Indeed, the generator manager 1504 generates modified digital images by combining spatial codes and global codes in various ways for style swapping, style blending, and attribute editing, as described above.

As shown, the deep image manipulation system 102 also includes the parameter learning manager 1506. In particular, the parameter learning manager 1506 learns, determines, modifies, obtains, adjusts, or parameters for a global and spatial autoencoder (e.g., the global and spatial autoencoder 112 including the encoder neural network 206 and the generator neural network 216). For example, the parameter learning manager 1506 trains the global and spatial autoencoder based on reconstruction and style swapping to accurately generate modified digital images by extracting and combining spatial and global codes.

The deep image manipulation system 102 further includes an image manipulation manager 1508. In particular, the image manipulation manager 1508 manipulates, modifies, edits, alters, or changes digital images by generating modified digital images for various applications. For example, the image manipulation manager 1508 generates modified digital images for style swapping, style blending, and attribute editing. The image manipulation manager 1508 can further receive user input to determine which modification to make to a digital image and a degree of such modification.

As shown, the deep image manipulation system 102 further includes a storage manager 1510. In particular, the storage manager 1510 manages or maintains the database 1512 (e.g., the database 114) to store data such as source digital images, target digital images, and a global and spatial autoencoder including an encoder neural network and a generator neural network.

In one or more embodiments, each of the components of the deep image manipulation system 102 are in communication with one another using any suitable communication technologies. Additionally, the components of the deep image manipulation system 102 can be in communication with one or more other devices including one or more client devices described above. It will be recognized that although the components of the deep image manipulation system 102 are shown to be separate in FIG. 15, any of the subcomponents may be combined into fewer components, such as into a single component, or divided into more components as may serve a particular implementation. Furthermore, although the components of FIG. 15 are described in connection with the deep image manipulation system 102, at least some of the components for performing operations in conjunction with the deep image manipulation system 102 described herein may be implemented on other devices within the environment.

The components of the deep image manipulation system 102 can include software, hardware, or both. For example, the components of the deep image manipulation system 102 can include one or more instructions stored on a computer-readable storage medium and executable by processors of one or more computing devices (e.g., the computing device 1500). When executed by the one or more processors, the computer-executable instructions of the deep image manipulation system 102 can cause the computing device 1500 to perform the methods described herein. Alternatively, the components of the deep image manipulation system 102 can comprise hardware, such as a special purpose processing device to perform a certain function or group of functions. Additionally or alternatively, the components of the deep image manipulation system 102 can include a combination of computer-executable instructions and hardware.

Furthermore, the components of the deep image manipulation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the deep image manipulation system 102 may be implemented as part of a stand-alone application on a personal computing device or a mobile device. Alternatively or additionally, the components of the deep image manipulation system 102 may be implemented in any application that allows creation and delivery of marketing content to users, including, but not limited to, applications in ADOBE EXPERIENCE MANAGER and ADOBE CREATIVE CLOUD, such as ADOBE ILLUSTRATOR, ADOBE PHOTOSHOP, and ADOBE INDESIGN. "ADOBE," "ADOBE EXPERIENCE MANAGER," "ADOBE CREATIVE CLOUD," "ADOBE ILLUSTRA- TOR," "ADOBE PHOTOSHOP," and "ADOBE INDESIGN" are trademarks of Adobe Inc. in the United States and/or other countries FIGS. 1-15, the corresponding text, and the examples provide a number of different systems, methods, and non-transitory computer readable media for training and applying a swapping to generate digital images (e.g., reconstructed digital images or modified digital images) by extracting and combining spatial and global codes in various ways. In addition to the foregoing, embodiments can also be described in terms of flowcharts comprising acts for accomplishing a particular result. For example, FIG. 16 illustrates a flowchart of an example sequence or series of acts in accordance with one or more embodiments.

Figure 16:
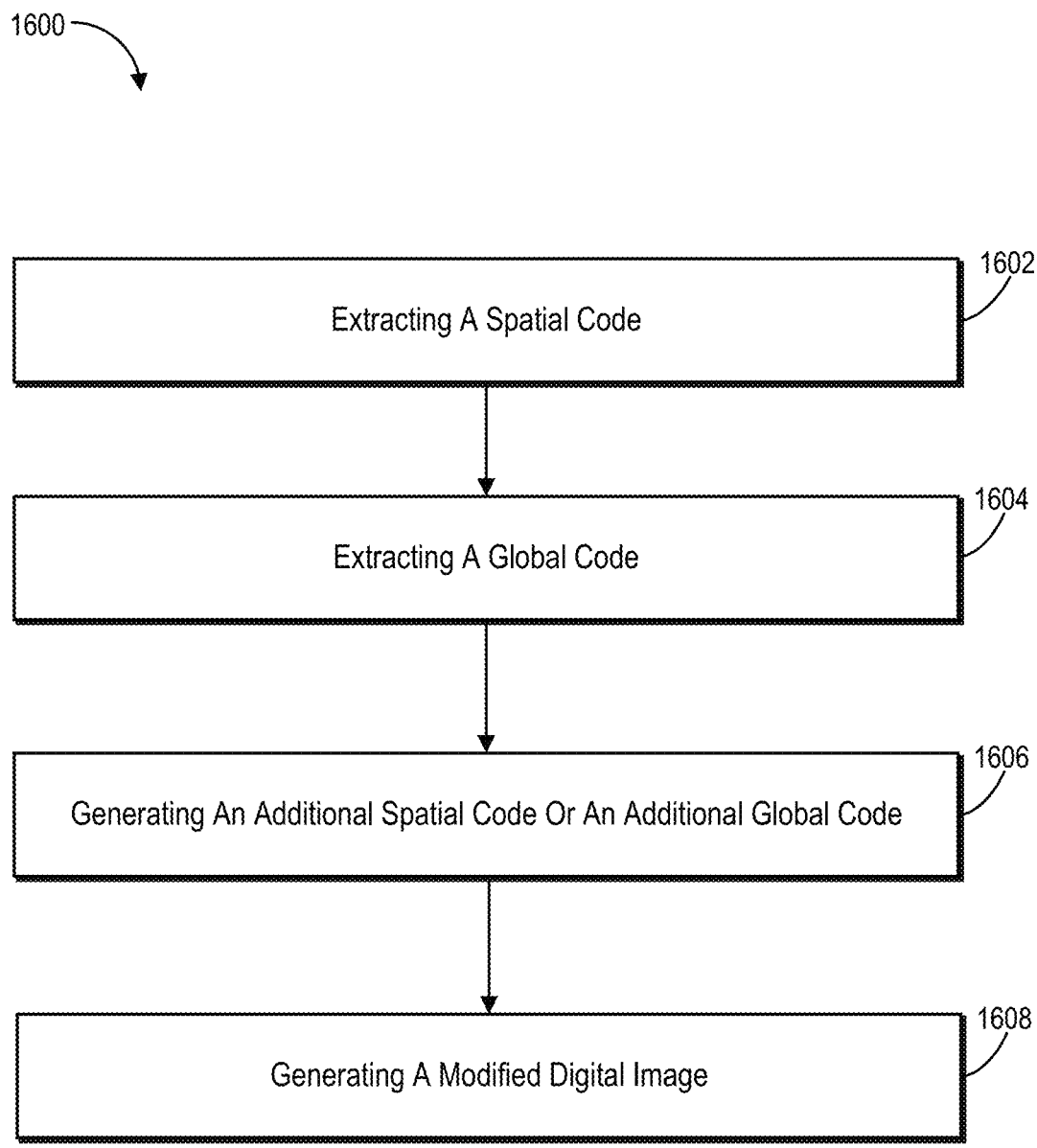
FIG. 16 illustrates a flowchart of a series of acts for generating a modified digital image by extracting and combining spatial codes and global codes from digital images in accordance with one or more embodiments.

While FIG. 16 illustrates acts according to one embodiment, alternative embodiments may omit, add to, reorder, and/or modify any of the acts shown in FIG. 16. The acts of FIG. 16 can be performed as part of a method. Alternatively, a non-transitory computer readable medium can comprise instructions, that when executed by one or more processors, cause a computing device to perform the acts of FIG. 16. In still further embodiments, a system can perform the acts of FIG. 16. Additionally, the acts described herein may be repeated or performed in parallel with one another or in parallel with different instances of the same or other similar acts.

FIG. 16 illustrates an example series of acts 1600 for generating a modified digital image by extracting spatial codes and global codes from digital images and combining a spatial code from one digital image with a global code from another digital image. In particular, the series of acts 1600 includes an act 1602 of extracting a spatial code. For example, the act 1602 can involve extracting from a digital image, utilizing an encoder neural network, a spatial code comprising features corresponding to a geometric layout of the digital image. In some embodiments, the act 1602 can include passing intermediate features from layers of the encoder neural network into one or more layout blocks to increase spatial resolution and to decrease channel dimension. In one or more embodiments, the act 1602 includes extracting from the first digital image, utilizing the encoder neural network: a first spatial code comprising features corresponding to a geometric layout of the first digital image, and a first global code comprising features corresponding to an overall appearance of the first digital image.

In addition, the series of acts 1600 includes an act 1604 of extracting a global code. In particular, the act 1604 can involve extracting from the digital image, utilizing the encoder neural network, a global code comprising features corresponding to an overall appearance of the digital image. The act 1604 can include passing features of the first digital image through residual blocks of the encoder neural network to increase channel dimension and to decrease spatial resolution.

Further, the series of acts 1600 includes an act 1606 of generating an additional spatial code or an additional global code. In particular, the act 1606 can involve generating one or more of an additional spatial code or an additional global code. The act 1606 can include extracting, from a first set of digital images that depict an attribute, a first set of latent codes utilizing the encoder neural network. The act 1606 can also include extracting, from a second set of digital images that do not depict the attribute, a second set of latent codes utilizing the encoder neural network. The act 1606 can further include generating an attribute direction by determining a difference between an average for the first set of latent codes and an average for the second set of latent codes. The act 1606 can further involve modifying the spatial code of the digital image based on a spatial component of the attribute direction and a magnitude to generate the additional spatial code. Still further act 1606 can involve modifying the global code of the digital image and a global component of the attribute direction and the magnitude to generate the additional global code.

In some embodiments, the act 1606 involves extracting from an additional digital image, utilizing the encoder neural network: the additional spatial code comprising features corresponding to a geometric layout of the additional digital image, or the additional global code comprising features corresponding to the overall appearance of the additional digital image. The act 1606 can also or alternatively include extracting, from a plurality of digital images, a plurality of global codes utilizing the encoder neural network and generating a composite global code from the plurality of global codes.

In one or more embodiments, the act 1606 includes extracting from the second digital image, utilizing the encoder neural network: a second spatial code comprising features corresponding to a geometric layout of the second digital image, and a second global code comprising features corresponding to an overall appearance of the second digital image.

As shown, the series of acts 1600 also includes an act 1608 of generating a modified digital image. In particular, the act 1608 can involve generating a modified digital image by combining, utilizing a generator neural network, the spatial code with the additional global code or the global code with the additional spatial code to construct the modified digital image. The act 1608 can include generating a modified spatial code by interpolating between the spatial code of the digital image and a spatial component of the attribute code. In addition, the act 1608 can include generating a modified global code by interpolating between the global code of the digital image and a global component of the attribute code. Further, the act 1608 can include combining the modified spatial code with the modified global code utilizing the generator neural network. In some embodiments, the act 1608 can involve generating the modified digital image to include spatial features of the digital image and global features of the additional digital image or global features of the digital image and spatial features of the additional digital image. The act 1608 can include combining the composite global code with the spatial code utilizing the generator neural network.

In some embodiments, the series of acts 1600 includes an act of generating a modified composite global code by combining the composite global code with a global code from the first digital image utilizing a slider variable for adjusting a relative weight between the composite global code and the global code from the first digital image. The act 1608 can then include an act of generating the modified digital image by combining the modified composite global code with the spatial code. The act 1608 can include generating a modified digital image comprising features of the first digital image and features of the second digital image by combining, utilizing the generator neural network, the first spatial code with the second global code or the first global code with the second spatial code.

The series of acts 1600 can include an act of learning parameters of the encoder neural network and the generator neural network by utilizing a contrastive loss to shift reconstructed spatial codes and reconstructed global codes from the modified digital image to be more similar to extracted spatial codes and extracted global codes from the first digital image and the second digital image than to stored spatial codes or stored global codes from a digital image code repository. The series of acts 1600 can include an act of learning parameters of a global and spatial autoencoder by utilizing a contrastive loss to compare: a reconstructed spatial code from the modified digital image with an extracted spatial code from the first digital image and with stored spatial codes from a digital image code repository, and a reconstructed global code from the modified digital image with an extracted global code from the second digital image and with stored global codes from the digital image code repository.

The series of acts 1600 can include an act of combining the first spatial code with the second global code utilizing a slider variable for adjusting a weight associated with the second global code. Further, the series of acts 1600 can include an act of providing the modified digital image for display on a client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
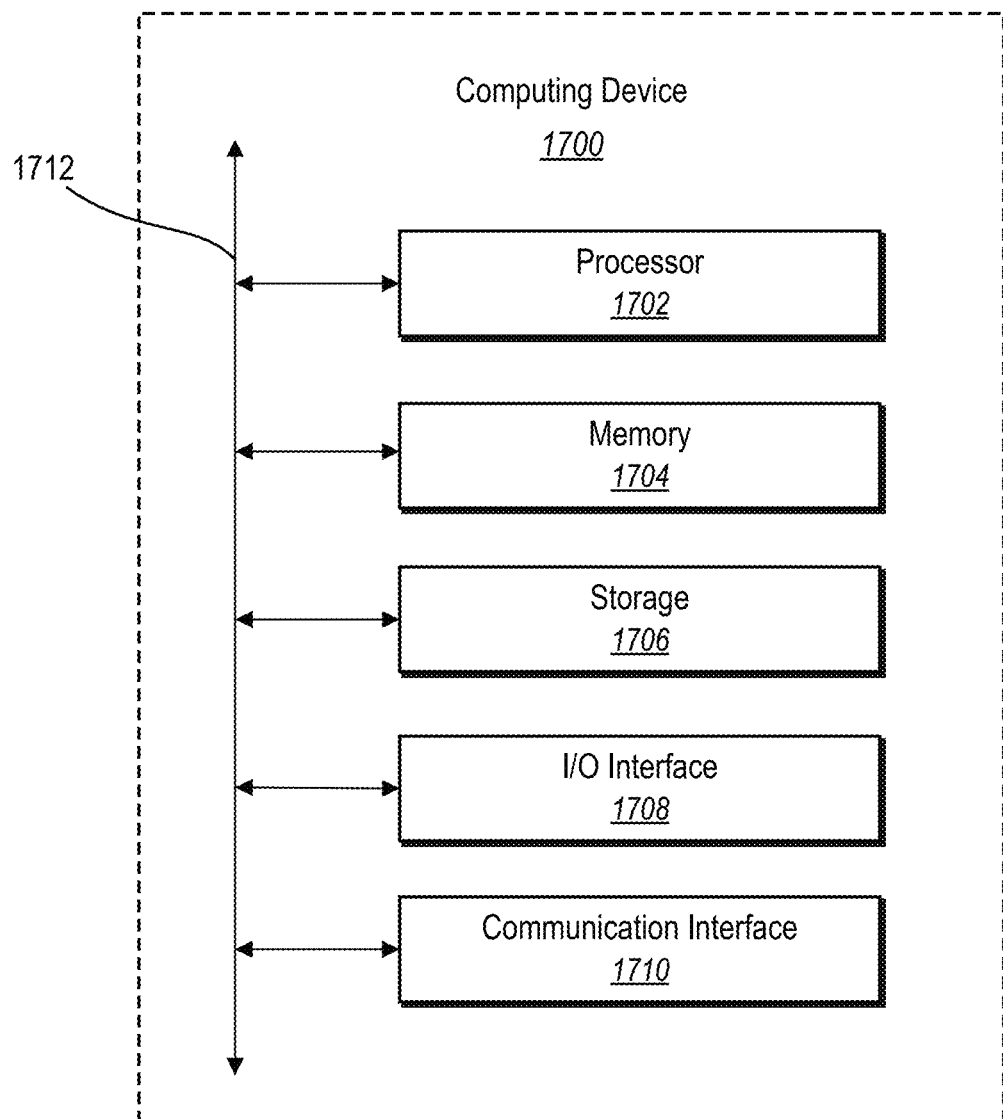
FIG. 17 illustrates a block diagram of an example computing device in accordance with one or more embodiments.

FIG. 17 illustrates, in block diagram form, an example computing device 1700 (e.g., the computing device 1500, the client device 108, and/or the server(s) 104) that may be configured to perform one or more of the processes described above. One will appreciate that the deep image manipulation system 102 can comprise implementations of the computing device 1700. As shown by FIG. 17, the computing device can comprise a processor 1702, memory 1704, a storage device 1706, an I/O interface 1708, and a communication interface 1710. Furthermore, the computing device 1700 can include an input device such as a touchscreen, mouse, keyboard, etc. In certain embodiments, the computing device 1700 can include fewer or more components than those shown in FIG. 17. Components of computing device 1700 shown in FIG. 17 will now be described in additional detail.

In particular embodiments, processor(s) 1702 includes hardware for executing instructions, such as those making up a computer program. As an example, and not by way of limitation, to execute instructions, processor(s) 1702 may retrieve (or fetch) the instructions from an internal register, an internal cache, memory 1704, or a storage device 1706 and decode and execute them.

The computing device 1700 includes memory 1704, which is coupled to the processor(s) 1702. The memory 1704 may be used for storing data, metadata, and programs for execution by the processor(s). The memory 1704 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1704 may be internal or distributed memory.

The computing device 1700 includes a storage device 1706 includes storage for storing data or instructions. As an example, and not by way of limitation, storage device 1706 can comprise a non-transitory storage medium described above. The storage device 1706 may include a hard disk drive (HDD), flash memory, a Universal Serial Bus (USB) drive or a combination of these or other storage devices.

The computing device 1700 also includes one or more input or output ("I/O") devices/interfaces 1708, which are provided to allow a user to provide input to (such as user strokes), receive output from, and otherwise transfer data to and from the computing device 1700. These I/O devices/interfaces 1708 may include a mouse, keypad or a keyboard, a touch screen, camera, optical scanner, network interface, modem, other known I/O devices or a combination of such I/O devices/interfaces 1708. The touch screen may be activated with a writing device or a finger.

The I/O devices/interfaces 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1708 is configured to provide graphical data to a display for presentation to a user. The graphical data may be representative of one or more graphical user interfaces and/or any other graphical content as may serve a particular implementation.

The computing device 1700 can further include a communication interface 1710. The communication interface 1710 can include hardware, software, or both. The communication interface 1710 can provide one or more interfaces for communication (such as, for example, packet-based communication) between the computing device and one or more other computing devices 1700 or one or more networks. As an example, and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI. The computing device 1700 can further include a bus 1712. The bus 1712 can comprise hardware, software, or both that couples components of computing device 1700 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
　　extract from a digital image, utilizing an encoder neural network, a spatial code comprising features representing a geometric layout of the digital image;
　　extract from a plurality of digital images, utilizing the encoder neural network, a plurality of global codes comprising features representing overall style properties of the plurality of digital images;
　　generate a composite global code from the plurality of global codes; and
　　generate a modified digital image by combining, utilizing a generator neural network, the spatial code with the composite global code.

2. The non-transitory computer readable medium of claim 1, further comprising instructions that, when executed by the at least one processor, cause the computing device to extract the spatial code by passing intermediate features from layers of the encoder neural network into one or more layout blocks to increase spatial resolution and to decrease channel dimension.

3. The non-transitory computer readable medium of claim 1, further comprising instructions that, when executed by the at least one processor, cause the computing device to generate the composite global code by combining the plurality of global codes from the plurality of digital images.

4. The non-transitory computer readable medium of claim 1, further comprising instructions that, when executed by the at least one processor, cause the computing device to generate the composite global code by averaging the plurality of global codes from the plurality of digital images.

5. The non-transitory computer readable medium of claim 1, further comprising instructions that, when executed by the at least one processor, cause the computing device to generate the modified digital image by combining, utilizing the generator neural network, the spatial code and the composite global code according to weights for emphasizing the spatial code and the composite global code.

6. The non-transitory computer readable medium of claim 1, further comprising instructions that, when executed by the at least one processor, cause the computing device to generate the modified digital image by combining the spatial code and the composite global code according to a slider variable that balances interpolation between the spatial code and the composite global code.

7. The non-transitory computer readable medium of claim 6, further comprising instructions that, when executed by the at least one processor, cause the computing device to receive an indication of user input to modify the slider variable.

8. The non-transitory computer readable medium of claim 7, further comprising instructions that, when executed by the at least one processor, cause the computing device to update the modified digital image utilizing the generator neural network according to the indication of user input to modify the slider variable.

9. The non-transitory computer readable medium of claim 1, further comprising instructions that, when executed by the at least one processor, cause the computing device to generate the modified digital image by interpolating a source global code associated with the digital image toward the composite global code from the plurality of digital images.

10. The non-transitory computer readable medium of claim 1, further comprising instructions that, when executed by the at least one processor, cause the computing device to:
generate a modified composite global code by combining the composite global code with a global code from the digital image utilizing a slider variable for adjusting a relative weight between the composite global code and the global code from the digital image; and
generate the modified digital image by combining the modified composite global code with the spatial code utilizing the generator neural network.

11. A system comprising:
one or more memory devices comprising a digital image, a plurality of digital images, and a global and spatial autoencoder comprising an encoder neural network and a generator neural network; and
one or more computing devices that are configured to cause the system to:
extract from the digital image, utilizing the encoder neural network, a spatial code comprising features representing a geometric layout of the digital image;
extract from the plurality of digital images, utilizing the encoder neural network a plurality of global codes comprising features representing overall style properties of the plurality of digital images;
generate a composite global code from the plurality of global codes; and
generate a modified digital image comprising features of the digital image and features of the plurality of digital images by combining, utilizing the generator neural network, the spatial code with the composite global code.

12. The system of claim 11, wherein the one or more computing devices are further configured to cause the system to learn parameters of the encoder neural network and the generator neural network by utilizing a contrastive loss to shift reconstructed spatial codes and reconstructed global codes from the modified digital image to be more similar to extracted spatial codes and extracted global codes from the digital image and the plurality of digital images than to stored spatial codes or stored global codes from a digital image code repository.

13. The system of claim 11, wherein the one or more computing devices are further configured to cause the system to extract the spatial code by passing intermediate features from layers of the encoder neural network into one or more layout blocks to increase spatial resolution and to decrease channel dimension.

14. The system of claim 11, wherein the one or more computing devices are further configured to cause the system to extract the plurality of global codes by passing features of the plurality of digital images through residual blocks of the encoder neural network to increase channel dimension and to decrease spatial resolution.

15. The system of claim 11, wherein the one or more computing devices are further configured to cause the system to combine the spatial code with the composite global code utilizing a slider variable for adjusting a weight associated with the composite global code.

16. A computer-implemented method for deep image manipulation utilizing global and spatial autoencoders, the computer-implemented method comprising:
extracting from a digital image, utilizing an encoder neural network, spatial code comprising features representing a geometric layout of the digital image;
extracting from a plurality of digital images, utilizing the encoder neural network, a plurality of global codes comprising features representing overall style properties of the plurality of digital images;
generating a composite global code from the plurality of global codes;
generating a modified digital image by combining the spatial code with the composite global code; and
providing the modified digital image for display on a client device.

17. The computer-implemented method of claim 16, wherein:
extracting the plurality of global codes from the plurality of digital images comprises extracting global features from the plurality of digital images that represent overall appearances of the plurality of digital images utilizing a global and spatial autoencoder; and
extracting the spatial code from the digital image comprises extracting spatial features from the digital image that represent a geometric layout of the digital image utilizing the global and spatial autoencoder.

18. The computer-implemented method of claim 17, wherein generating the modified digital image comprises utilizing a generator neural network of the global and spatial autoencoder to combine the spatial code and the composite global code.

19. The computer-implemented method of claim 16, wherein generating the modified digital image comprises utilizing a slider variable for adjusting a weight associated with the composite global code.

20. The computer-implemented method of claim 16, wherein generating the modified digital image comprises blending styles of the digital image and the plurality of digital images.

* * * * *